US009785030B2

(12) United States Patent
Biver et al.

(10) Patent No.: US 9,785,030 B2
(45) Date of Patent: Oct. 10, 2017

(54) ELECTROCHROMIC COMPOSITION

(71) Applicant: ESSILOR INTERNATIONAL (COMPAGNIE GENERALE D'OPTIQUE), Charenton-le-Pont (FR)

(72) Inventors: Claudine Biver, Charenton-le-Pont (FR); Samuel Archambeau, Charenton-le-Pont (FR); Fabien Berit-Debat, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

(21) Appl. No.: 15/022,775

(22) PCT Filed: Sep. 16, 2014

(86) PCT No.: PCT/EP2014/069731
§ 371 (c)(1),
(2) Date: Mar. 17, 2016

(87) PCT Pub. No.: WO2015/040030
PCT Pub. Date: Mar. 26, 2015

(65) Prior Publication Data
US 2016/0282694 A1 Sep. 29, 2016

(30) Foreign Application Priority Data
Sep. 17, 2013 (EP) ..................................... 13184810

(51) Int. Cl.
G02F 1/15 (2006.01)
G02C 7/10 (2006.01)
C09K 9/02 (2006.01)

(52) U.S. Cl.
CPC ............. *G02F 1/1521* (2013.01); *C09K 9/02* (2013.01); *G02C 7/101* (2013.01); *G02C 7/10* (2013.01); *G02F 1/15* (2013.01)

(58) Field of Classification Search
CPC .......... G02F 1/15; G02F 1/1521; G02F 1/153; G02F 2001/1502; G02F 2001/1512; G02F 2001/1515; C09K 9/00; C09K 9/02; G02C 7/10; G02C 7/101
USPC ......... 359/265, 272, 273, 275; 252/580, 583
See application file for complete search history.

(56) References Cited

U.S. PATENT DOCUMENTS

| | | | |
|---|---|---|---|
| 4,116,535 A | 9/1978 | Ponjee et al. ................. 359/272 |
| 5,278,693 A | 1/1994 | Theiste et al. ................ 359/272 |
| 5,336,448 A * | 8/1994 | Byker ...................... C09K 9/02 252/583 |
| 5,438,024 A | 8/1995 | Bolton et al. ..................... 501/55 |
| 5,998,617 A | 12/1999 | Srinivasa et al. ............. 544/347 |
| 6,023,364 A * | 2/2000 | Kobayashi ............. B60R 1/088 359/265 |
| 6,141,137 A | 10/2000 | Byker et al. ................... 359/265 |
| 6,255,238 B1 | 7/2001 | Brocheton ....................... 501/56 |
| 6,285,486 B1 * | 9/2001 | Kobayashi ............. B60R 1/088 359/265 |
| 6,519,072 B2 * | 2/2003 | Nishikitani .............. C09K 9/02 252/583 |
| 6,816,298 B2 * | 11/2004 | Nishikitani .............. C09K 9/02 252/583 |
| 6,867,894 B2 * | 3/2005 | Asano ..................... G02F 1/155 252/583 |
| 7,106,489 B2 | 9/2006 | Berneth et al. ................ 359/273 |
| 8,736,946 B2 | 5/2014 | Archambeau et al. ........ 359/275 |
| 2002/0027700 A1 | 3/2002 | Berneth et al. ................ 359/265 |
| 2005/0231784 A1 | 10/2005 | Shinohara et al. ............ 359/265 |
| 2009/0082570 A1 | 3/2009 | Nii et al. ....................... 546/258 |
| 2011/0235150 A1 | 9/2011 | Das et al. ...................... 539/273 |
| 2016/0221949 A1 * | 8/2016 | Aiken ................. C07D 213/80 |
| 2016/0231636 A1 * | 8/2016 | Biver ....................... C09K 9/02 |

FOREIGN PATENT DOCUMENTS

| | | |
|---|---|---|
| EP | 0180204 | 5/1986 |
| EP | 1156098 | 11/2001 |
| EP | 2407526 | 1/2012 |
| EP | 2848667 | 3/2015 |
| EP | 2848668 | 3/2015 |
| FR | 2937154 | 4/2010 |
| FR | 2950710 | 4/2011 |
| GB | 1514466 | 6/1978 |
| JP | S52135884 | 11/1977 |

(Continued)

OTHER PUBLICATIONS

Database CA [Online] Chemical Abstracts Service, Columbus, Ohio, US; 1982 "Composition for electrochromic displays", XP002724222, retrieved from STN Database accession No. 1982:605815 abstract-& JP 57 057779 A (Mitsubishi Electric Corp., Japan) Apr. 7, 1982 (Apr. 7, 1982).
Database Database CA [Online] Chemical Abstracts Service, Columbus, Ohio, US; 1980, "Electrochromic substances for display devices", XP002724143, retrieved from STN accession No. 1980:613419 abstract—& JP 55 054381 A (Hitachi, Ltd., Japan) Apr. 21, 1980 (Apr. 21, 1980).
Clennan et al., "Pyrylogens: Synthesis, Structural, Electrochemical, and Photophysical Characterization of a New Class of Electron Transfer Sensitizers", *J Am Chem Soc*, 130(24): 7552-3, 2008.
Downes, "Aryl-substituted Derivatives of 4,4'-Bipyridylium Salts: their Spectroscopic Properties and Stereochemistry", *J. Chem. Soc.* (*C*), p. 1491-93, 1967.
International Search Report and Written Opinion issued in PCT/EP2014/069731, mailed on Apr. 10, 2015.

(Continued)

Primary Examiner — Loha Ben
(74) Attorney, Agent, or Firm — Norton Rose Fulbright US LLP

(57) ABSTRACT

The present invention relates to an electrochromic composition comprising at least one reducing compound and at least two oxidizing compounds, said at least two oxidizing compounds having similar oxydo-reduction potentials. More specifically, said at least two oxidizing compounds are selected from viologen derivatives. Said composition can be used as a variable transmittance medium for the manufacture of an optical article, such as an ophthalmic lens.

15 Claims, 1 Drawing Sheet

(56) References Cited

FOREIGN PATENT DOCUMENTS

| JP | S5437080 A | 3/1979 |
| JP | H11106376 | 4/1999 |
| WO | WO 98/44384 | 10/1998 |
| WO | WO 2006/013250 | 2/2006 |
| WO | WO 2008/028930 | 3/2008 |
| WO | WO 2010/024840 | 3/2010 |
| WO | WO 2011/082354 | 7/2011 |
| WO | WO 2015/040029 | 3/2015 |
| WO | WO 2015/040031 | 3/2015 |
| WO | WO 2015/040033 | 3/2015 |

OTHER PUBLICATIONS

International Search Report and Written Opinion issued in PCT/EP2014/069737, mailed on Apr. 15, 2015.
International Search Report and Written Opinion issued in PCT/EP2014/069730, mailed on Apr. 15, 2015.
International Search Report and Written Opinion issued in PCT/EP2014/069734, mailed on Oct. 6, 2014.

\* cited by examiner

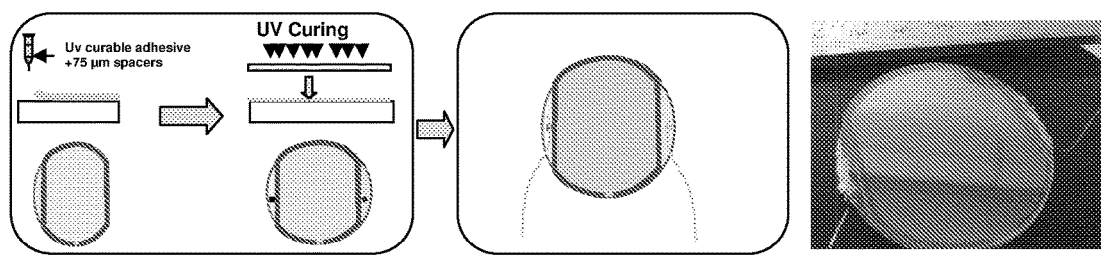
Cell assembly         Electrical connection
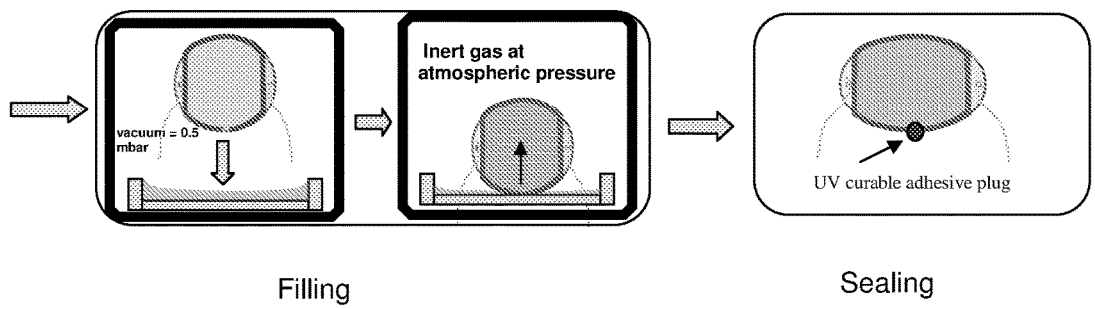
Filling                              Sealing

ELECTROCHROMIC COMPOSITION

CROSS-REFERENCE TO RELATED APPLICATIONS

This application is a national phase application under 35 U.S.C. §371 of International Application No. PCT/EP2014/069731 filed 16 Sep. 2014, which claims priority to European Patent Application No. 13184810.3 filed 17 Sep. 2013. The entire contents of each of the above-referenced disclosures is specifically incorporated by reference herein without disclaimer.

BACKGROUND

The present invention relates to an electrochromic composition comprising at least one reducing compound and at least two oxidizing compounds, said at least two oxidizing compounds having similar oxydo-reduction potentials. More specifically, said at least two oxidizing compounds are selected from viologen derivatives. Said composition can be used as a variable transmittance medium for the manufacture of an optical article, such as an ophthalmic lens.

Electrochromism is a well-known physical phenomenon which is observed with certain classes of chemical compounds that change reversibly colour when a voltage is applied to them. The material undergoes reversible changes in optical properties by oxidation and reduction. Usually the electrochromic material may be colourless when an electric field is not applied and may be coloured when an electric field is applied.

An electrochromic device, i.e. device containing electrochromic compounds, the absorbance of which depends only on the presence of electric field, can thus have two states, a coloured state or visible light absorbing state (when electrically activated) and a bleached state (in the inactive state). The optical transmission properties of the device depend on the electrochromic compounds.

When preparing an electrochromic composition to be used as transparent media for forming high quality optical articles, in particular high quality ophthalmic lenses, the choice of electrochromic compounds is critical. Indeed, electrochromic compounds need not only to show good electrochromic properties such as high absorption of the visible light in the coloured state, low absorption of visible radiations in the bleached state, fast colouring and fading rates, but should also have long-term stability, in particular in the presence of oxygen, and good solubility in conventional solvents. Gathering all the required properties in one single compound is a real challenge. Many studies have already been conducted for providing electrochromic compounds having the best compromise. For example, viologen compounds have been identified as compounds of particular interest due to their high molar absorption coefficient. Their molar absorption coefficient is indeed higher than other electrochromic compounds, such as ferrocene or dihydrophenazine derivatives, usually used in electrochromic devices.

Another difficulty to face when using electrochromic composition in ophthalmic applications is to meet the consumer demand, which requires a wide range of colours available, and in particular neutral colours (i.e. brown, grey, grey-green . . . ). Such neutral colour can be preferentially chosen with respect of the ISO Standard 1836, which defines the relative visual attenuation coefficient of filters of categories 0, 1, 2 and 3. Other examples of tints defining a neutral colour are given in documents U.S. Pat. No. 6,255,238 and U.S. Pat. No. 5,438,024.

Electrochromic composition having the desired colour can be obtained by mixing different electrochromic compounds. These different electrochromic compounds can be oxidizing electrochromic compounds as well as reducing electrochromic compounds.

However, obtaining the desired colour for an electrochromic composition is an exercise much more complex than simply mixing colours. Indeed, in addition to the numerous requirements that the electrochromic compounds should meet, the challenge of using a combination of different electrochromic compounds lays in the compatibility of said electrochromic compounds with each other. For instance, the absorption coefficient of commonly used electrochromic reducing compounds is generally far lower than electrochromic oxidizing compounds such as viologen compounds. On the other hand, the use of a combination of several electrochromic oxidizing compounds in a single composition further requires that the electrochromic oxidizing compounds have oxydo-reducing potentials close enough so that they can change colour simultaneously when a potential is applied to the composition.

Therefore, there is a need for providing an electrochromic composition having the desired colour in the coloured state or visible light absorbing state, while maintaining good electrochromic properties such as high absorption in the coloured state, low absorption of visible radiations in the bleached state, fast colouring and fading rates and long-term stability, in particular to oxygen or ageing performance.

SUMMARY OF INVENTION

After conducting extensive research, the present inventors provide an electrochromic composition comprising at least two oxidizing compounds selected from viologen derivatives of formulae (I) and (II). Compounds of formulae (I) and (II) have compatible oxydo-reducing potentials so that they can change colour simultaneously when a potential is applied to the composition. Moreover, the viologen derivatives of formulae (I) and (II) can show a wide variety of colours in their coloured states, including red, blue and green, which enables obtaining the desired colour, and in particular neutral colours, for the electrochromic composition of the invention. In particular, the colour of the electrochromic composition can be adapted to the desired colour without the need of a specifically coloured electrochromic reducing compound. In other words, the suitable reducing compound can be chosen focussing on other properties such as none or low visible light absorption, stability or solubility, regardless of the coloured state or visible light absorbing state that such a reducing compound may have. The suitable compounds of formulae (I) and (II) can be chosen, possibly taking into account the colour of the reducing compounds, so as to obtain the electrochromic composition having the desired colour in the coloured state.

The present invention relates more particularly to an electrochromic composition comprising:

at least one reducing compound; and at least two electrochromic oxidizing compounds, wherein said electrochromic oxidizing compounds have similar oxydo-reduction potentials; and are selected from viologen derivatives of formulae (I) and (II):

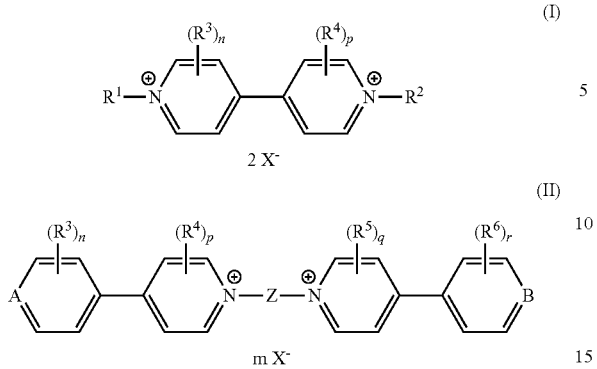

wherein:
- R$^1$ and R$^2$ are each independently selected from optionally substituted phenyl groups;
- R$^3$, R$^4$, R$^5$ and R$^6$ are each independently selected from H, alkyl, alkoxy, alkylthio, haloalkyl, haloalkoxy, haloalkythio, polyakylenoxy, alkoxycarbonyl, aryl, substituted aryl, heteroaryl and substituted heteroaryl, wherein the alkyl group may be substituted by one or more substituents independently selected from alkoxy, cycloalkyl, aryl, substituted aryl, heteroaryl and substituted heteroaryl;
- n, p, q and r are each independently an integer from 0 to 4, wherein when n, p, q or r is two or more, each of the R$^3$, each of the R$^4$, each of the R$^5$ or each of the R$^6$ may be identical or different;
- A and B are respectively selected from nitrogen and —N$^+$(R$^{7a}$)—, and from nitrogen and —N$^+$(R$^{7b}$)—, wherein R$^{7a}$ and R$^{7b}$ are independently selected from:
  - alkyl which may be substituted by one or more groups independently selected from halogen, alkoxy, cycloalkyl, vinyl, allyl, aryl, substituted aryl, heteroaryl and substituted heteroaryl;
  - aryl and heteroaryl which may be both substituted by one or more groups independently selected from:
    - halogen, cyano, nitro, alkyl, haloalkyl, arylalkyl, cycloalkyl, cycloalkylalkyl and heterocycloalkylalkyl, alkenyl, alkynyl, allyl, vinyl, aryl, substituted aryl, heteroaryl, substituted heteroaryl, —N(aryl)$_2$, —N(aryl)CO(aryl), —CO-aryl and —CO— substituted aryl;
    - —OR$^8$, —SR$^8$, —S(O)R$^8$, —S(O$_2$)R$^8$, —S(O$_2$)NR$^8$R$^9$, —NR$^8$R$^9$, —NR$^8$COR$^9$, —NR$^8$CO(aryl), —NR$^8$aryl, —CH$_2$OR$^8$, —CH$_2$SR$^8$, —CH$_2$R$^8$, —CO—R$^8$ and —CO$_2$R$^8$ wherein R$^8$ and R$^9$ are independently selected from H, alkyl, haloalkyl, arylalkyl, cycloalkyl, cycloalkylalkyl and heterocycloalkylalkyl;
    - —S(O$_2$)NR$^{10}$R$^{11}$ and —NR$^{10}$R$^{11}$, wherein R$^{10}$ and R$^{11}$ form together with the nitrogen atom to which they are linked a saturated 5 to 7 membered heterocycloalkyl which may comprise in addition to the nitrogen atom one further heteroatom selected from oxygen, nitrogen and sulphur, and which may be optionally substituted by one or two groups independently selected from halogen, —R$^8$, —OR$^8$, and —NR$^8$R$^9$, wherein R$^8$ and R$^9$ are as defined above;
    - —V—W—R$^{12}$ wherein:
      - V is selected from oxygen, —N(R$^8$)—, sulphur, —S(O)— and —S(O$_2$)— wherein R$^8$ is as defined above;
      - W is alkylene, which may be substituted by one or more groups independently selected from halogen and alkoxy; and
      - R$^{12}$ is selected from —OR$^8$, —NR$^8$(alkyl) and —SR$^8$ wherein R$^8$ is as defined above; and
    - —OC(O)—R$^{13}$ wherein R$^{13}$ is selected from alkyl, haloalkyl, alkenyl, —W—R$^{12}$, and aryl group which may be substituted by 1 to 4 groups selected from halogen, —R$^8$, —OR$^8$, —SR$^8$, —NR$^8$R$^9$, —NR$^{10}$R$^{11}$, —CO—R$^8$, —C(O)OR$^8$, wherein R$^8$, R$^9$, R$^{10}$, R$^{11}$, R$^{12}$ and W are as defined above;
- Z is selected from:
  - alkylene;
  - cycloalkylene; and
  - a bivalent groups of formula —R$^{14}$—Y—R$^{15}$—, wherein:
    - R$^{14}$ and R$^{15}$ are each independently selected from single bond, alkylene and cycloalkylene, and
    - Y is selected from arylene, cycloalkylene, heteroarylene, arylene-arylene or arylene-CR'R''-arylene wherein R' and R'' form together with the carbon to which they are linked a carbocyclic group;
  - wherein said alkylene, cycloalkylene, arylene, heteroarylene and carbocyclic groups may be substituted by one or more substituents selected from halogen, alkyl, alkoxy, alkylthio, hydroxyalkyl, acyloxy, cycloalkyl, aryl, substituted aryl, aryloxy heteroaryl and substituted heteroaryl;
- m is 2 if A and B are nitrogen, 3 if one of A and B is nitrogen and the other is not nitrogen, and 4 if both A and B are not nitrogen;
- X$^-$ is a counterion.

When referring to the oxydo-reduction potential of the oxidizing compounds, it is referred to the first reduction potential of said oxidizing compounds.

The expression "alkylene" represents any divalent radical of a linear or branched hydrocarbon chain comprising 1 to 12 carbon atoms. Examples of C$_1$-C$_{12}$ alkylene groups include C$_1$-C$_4$ alkylene groups such as —CH$_2$—, —(CH$_2$)$_2$—, —(CH$_2$)$_3$—, —(CH$_2$)$_4$—, —CH(CH$_3$)—, —CH(CH$_3$)—CH$_2$—, —CH$_2$—CH(CH$_3$)—, —(CH$_2$)$_2$—CH(CH$_3$)—, —CH$_2$—CH(CH$_3$)—CH$_2$— or —CH(CH$_3$)—(CH$_2$)$_2$—, as well as —(CH$_2$)$_5$—, —(CH$_2$)$_6$—, —(CH$_2$)$_2$—CH(CH$_3$)—(CH$_2$)$_2$—, —(CH$_2$)$_3$—H(CH$_3$)—CH$_2$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_{12}$—.

The expression "cycloalkylene" represents any divalent radical of a monocyclic or bicyclic 3 to 12 membered carbocycle. Examples of C$_3$-C$_{12}$ alkylene groups include cyclopropylene, cyclopentylene, cyclohexylene, cycloheptylene, and decahydronaphthylene.

The expression "arylene" represents any divalent radical of an aromatic hydrocarbon comprising 6 to 18 carbon atoms. Examples of C$_6$-C$_{18}$ arylene groups include phenylene, naphthylene, anthracenylene and phenanthrenylene.

The expression "carbocyclic group" represents any monocyclic or fused polycyclic hydrocarbon rings comprising 3 to 20 carbon atoms and which may comprise one or more unsaturations. Examples of C$_3$-C$_{20}$ carbocyclic groups include C$_{10}$-C$_{20}$ fused hydrocarbon rings which may comprise one or more unsaturations, such as cyclohexenylene, indene, fluorene.

The expression "halogen" includes F, Cl, Br or I. Preferred halogens are F and Cl.

The expression "alkyl" represents any monovalent radical of a linear or branched hydrocarbon chain comprising 1 to 18 carbon atoms. Examples of $C_1$-$C_{18}$ alkyl groups include $C_1$-$C_4$ alkyl groups such as methyl, ethyl, n-propyl, i-propyl, n-butyl, i-butyl, s-butyl or t-butyl, $C_6$-$C_8$ alkyl groups such as n-hexyl, n-heptyl or n-octyl, as well as n-pentyl, 2-ethylhexyl, 3,5,5-trimethylhexyl, n-nonyl, n-decyl, n-undecyl, n-dodecyl or n-octadecyl.

The expression "alkoxy" represents a radical of formula —OR wherein R is a $C_1$-$C_{12}$ alkyl. Examples of $C_1$-$C_{12}$ alkoxy groups include $C_1$-$C_6$ alkoxy groups such as —OCH$_3$, —OCH$_2$CH$_3$ or —O(CH$_2$)$_5$CH$_3$.

The expression "cycloalkyl" represents any monovalent radical of a monocyclic or bicyclic 3 to 12 membered saturated carbocycle. Examples of $C_3$-$C_{12}$ cycloalkyl groups include cyclopropyl, cyclopentyl and cyclohexyl.

The expression "aryl" represents any monovalent radical of an aromatic hydrocarbon comprising 6 to 18 carbon atoms. Examples of $C_6$-$C_{18}$ aryl groups include phenyl, naphthyl, anthracenyl and phenanthrenyl.

The expression "substituted aryl" represents any $C_6$-$C_{18}$ aryl group as defined above substituted by one or more substituents selected from halogen, alkyl, alkoxy, alkynyl haloalkyl, haloalkoxy, alkoxycarbonyl, alkanoyl, aroyl, formyl, nitrile, nitro, amido, alkylthio, alkylsulfinyl, alkylsulfonyl, arylthio, arylsulfinyl, arylsulfonyl, amino, alkylamino, arylamino, dialkylamino and diarylamino. Preferably, the substituents are selected from bulky or electron withdrawing groups. Examples of substituted $C_6$-$C_{18}$ aryl groups include substituted phenyl groups such as p-methylphenyl, o-t-butylphenyl, p-trifluoromethoxyphenyl, o-trifluoromethoxyphenyl, m-cyanophenyl, o-i-propylphenyl, 2,4-dinitrophenyl, 2,6-diisopropylphenyl or 3,5-dicyanophenyl.

The expression "aryloxy" represents a radical of formula —OR wherein R is a $C_6$-$C_{18}$ aryl. Examples of $C_1$-$C_{12}$ aryloxy groups include phenyloxy and naphthyloxy.

The expression "heteroaryl" represents any monovalent radical of a monocyclic or bicyclic 5 to 10 membered aromatic group comprising from 1 to 3 heteroatoms independently selected from oxygen, nitrogen and sulfur. Examples of $C_5$-$C_{10}$ heteroaryl groups include furyl, thienyl, pyrrolyl, pyrazoyl, imidazolyl, isoxazolyl, isothiazoyl, thiazolyl, oxazolyl, 1,2,3-triazolyl, 1,2,4-triazolyl, 1-benzofuryl, 1-benzothienyl, indolyl, benzimidazolyl, indazolyl, 1,2-benzisoxazolyl, 2,1-benzisoxazolyl, 1,2-benzisothiazolyl, 2,1-benzisothiazolyl, benzothiazolyl, benzoxazolyl, benzotriazolyl, pyridyl, quinolinyl, isoquinolinyl, pyridazinyl, cinnolinyl, phthalazinyl, pyrimidinyl, quinazolinyl, pyrazinyl and quinoxalinyl.

The expression "heteroarylene" represents any divalent radical of a monocyclic or bicyclic 5 to 10 membered aromatic group comprising from 1 to 3 heteroatoms independently selected from oxygen, nitrogen and sulfur. Examples of $C_5$-$C_{10}$ heteroarylene groups include furylene, thienylene, pyrrolylene, pyrazoylene, imidazolylene, isoxazolylene, isothiazoylene, thiazolylene, oxazolylene, 1,2,3-triazolylene, 1,2,4-triazolylene, 1-benzofurylene, 1-benzothienylene, indolylene, benzimidazolylene, indazolylene, 1,2-benzisoxazolylene, 2,1-benzisoxazolylene, 1,2-benzisothiazolylene, 2,1-benzisothiazolylene, benzothiazolylene, benzoxazolylene, benzotriazolylene, pyridylene, quinolinylene, isoquinolinylene, pyridazinylene, cinnolinylene, phthalazinylene, pyrimidinylene, quinazolinylene, pyrazinylene and quinoxalinylene.

The expression "substituted heteroaryl" represents any heteroaryl group as defined above substituted by one or more substituents selected from alkyl, alkoxy, alkoxycarbonyl, alkanoyl, aroyl, formyl, nitrile, nitro, amido, alkylthio, alkylsulfinyl, alkylsulfonyl, arylthio, arylsulfinyl, arylsulfonyl, amino, alkylamino, arylamino, dialkylamino and diarylamino. Preferably, the substituents are selected from bulky or electron withdrawing groups. Examples of substituted $C_5$-$C_{10}$ heteroaryl groups include 4-methylthienyl, 5-methyl-2-thienyl, 6-methyl-2-pyridyl, N-methylpyrrol-2-yl and N-phenylindol-3-yl.

The expression "haloalkyl" represents any $C_1$-$C_{12}$ alkyl group substituted by one or more halogen atom such as F or Cl. Examples of $C_1$-$C_{12}$ haloalkyl groups include $C_1$-$C_{12}$ perhaloalkyl groups, in particular $C_1$-$C_4$ perhaloalkyl groups such as —CF$_3$, as well as $C_1$-$C_{12}$ (perhaloalkyl)alkyl groups, in particular ($C_1$-$C_4$ perhaloalkyl)-($C_1$-$C_4$ alkyl) groups such as —CH$_2$CF$_3$.

The expression "haloalkoxy" represents a radical of formula —OR wherein R is a $C_1$-$C_{12}$ haloalkyl. Examples of $C_1$-$C_{12}$ haloalkoxy include $C_1$-$C_{12}$ perhaloalkoxy groups, in particular $C_1$-$C_4$ perhaloalkoxy groups such as —OCF$_3$, as well as $C_1$-$C_{12}$ (perhaloalkyl)alkoxy groups, in particular ($C_1$-$C_4$ perhaloalkyl)-($C_1$-$C_4$ alkoxy) groups such as —OCH$_2$CF$_3$.

The expression "alkylthio" represents a radical of formula —SR wherein R is a $C_1$-$C_{12}$ alkyl. Examples of $C_1$-$C_{12}$ alkylthio groups include —SCH$_3$ and —SCH$_2$CH$_3$.

The expression "haloalkylthio" represents a radical of formula —SR wherein R is a $C_1$-$C_{12}$ haloalkyl. Examples of $C_1$-$C_{12}$ haloalkoxy groups include $C_1$-$C_{12}$ perhaloalkylthio groups, in particular $C_1$-$C_4$ perhaloalkylthio groups such as —SCF$_3$, as well as $C_1$-$C_{12}$ (perhaloalkyl)alkylthio groups, in particular ($C_1$-$C_4$ perhaloalkyl)-($C_1$-$C_4$ alkylthio) groups such as —SCH$_2$CF$_3$.

The expression "hydroxyalkyl" represents any $C_1$-$C_{12}$ alkyl group substituted by one or more hydroxyl groups. Examples of $C_1$-$C_{12}$ hydroxyalkyl groups include —CH$_2$OH and —CH$_2$CH$_2$OH.

The expression "acyloxy" represents a radical of formula —OC(O)R wherein R is a $C_1$-$C_{12}$ alkyl. Examples of $C_1$-$C_{12}$ acyloxy groups include —OC(O)CH$_3$ and —OC(O)CH$_2$CH$_3$.

The expression "polyalkylenoxy" represents a radical of formula —O(R'O)$_m$R wherein R' is a $C_1$-$C_{12}$ alkylene, R is a $C_1$-$C_{12}$ alkyl and m is an integer from 1 to 12. Examples of poly($C_1$-$C_{12}$ alkylenoxy) groups include OCH$_2$CH$_2$OCH$_3$.

The expression "alkoxycarbonyl" represent a radical of formula —C(O)OR wherein R is a $C_1$-$C_{18}$ alkyl. Examples of $C_1$-$C_{18}$ alkoxycarbonyl groups include $C_1$-$C_4$ alkoxycarbonyl groups such as —C(O)OCH$_3$ and —C(O)OC$_2$H$_5$.

In formula (II), Z called "the central core", is preferably selected from $C_1$-$C_{12}$ alkylene, $C_3$-$C_7$ cycloalkylene, $C_3$-$C_{14}$ arylene, $C_5$-$C_{10}$ heteroarylene, ($C_1$-$C_4$ alkylene)-($C_3$-$C_{14}$ arylene), ($C_1$-$C_4$ alkylene)-($C_3$-$C_{14}$ heteroarylene), ($C_1$-$C_4$ alkylene)-($C_3$-$C_{14}$ arylene)-($C_1$-$C_4$ alkylene), ($C_1$-$C_4$ alkylene)-($C_3$-$C_{14}$ heteroarylene)-($C_1$-$C_4$ alkylene), ($C_3$-$C_{14}$ arylene)-($C_3$-$C_{14}$ arylene), ($C_1$-$C_4$ alkylene)-($C_3$-$C_{14}$ arylene)-($C_3$-$C_{14}$ arylene)-($C_1$-$C_4$ alkylene) and ($C_3$-$C_{14}$ arylene)-(CR'R")—($C_3$-$C_{14}$ arylene) wherein R' and R" form together with the carbon to which they are linked a $C_3$-$C_{20}$ carbocyclic group; wherein the arylene and cycloalkylene groups may be substituted by one or more substituents selected from halogen, $C_1$-$C_4$ alkyl, $C_1$-$C_4$ alkoxy and $C_3$-$C_7$ cycloalkyl and the alkylene groups may be substituted by one or more substituents selected from halogen, $C_3$-$C_{14}$ alkyl, $C_1$-$C_{12}$ alkoxy, $C_2$-$C_{12}$ acyloxy, $C_1$-$C_{12}$ hydroxyalkyl, $C_3$-$C_{12}$ cycloalkyl, phenyl, phenyloxy and substituted phenyl. In particular, substituted alkylene include —$CH_2$ ($CR^aR^b$)$CH_2$— wherein $R^a$ and $R^b$ may be independently selected from H, $C_3$-$C_{14}$ alkyl, $C_3$-$C_{12}$ cycloalkyl, (cycloalkyl)methyl, aryl, substituted aryl, arylalkyl such as benzyl or phenyl($C_2$-$C_7$ alkyl), phenyloxyethyl, substituted arylalkyl, $C_1$-$C_{12}$ alkoxy, $C_2$-$C_{12}$ acyloxy, $C_1$-$C_{12}$ hydroxyalkyl, and $C_1$-$C_{12}$ alkoxymethyl.

More preferably, Z is selected from $C_1$-$C_{12}$ alkylene, aryl substituted $C_1$-$C_{12}$ alkylene, phenylene, naphthylene, ($C_1$-$C_4$ alkylene)-phenylene-($C_1$-$C_4$ alkylene), ($C_1$-$C_4$ alkylene)-naphthylene-($C_1$-$C_4$ alkylene) such as naphthylene bis(methylene), quinoxaline-2,3-diyl, ($C_1$-$C_4$ alkylene)-quinoxaline-2,3-diyl-($C_1$-$C_4$ alkylene) such as quinoxaline-2,3-diylbis(methylene), phenylene-phenylene, ($C_1$-$C_4$ alkylene)-phenylene-phenylene-($C_1$-$C_4$ alkylene) and phenylene-fluorenylene-phenylene. For example, Z may be selected from —$CH_2$—, —$(CH_2)_2$—, —$(CH_2)_3$—, —$(CH_2)_4$—, —$(CH_2)_5$—, —$CH_2$—$CH(CH_3)$—$CH_2$, —$CH_2$—$CH(CH_2Phenyl)$-$CH_2$—, —$(CH_2)_2$—$CH(CH_3)$—$CH_2$—, —$(CH_2)_3$—$CH(CH_3)$—$CH_2$—, —$(CH_2)_2$—$CH(CH_3)$—$(CH_2)_2$—,

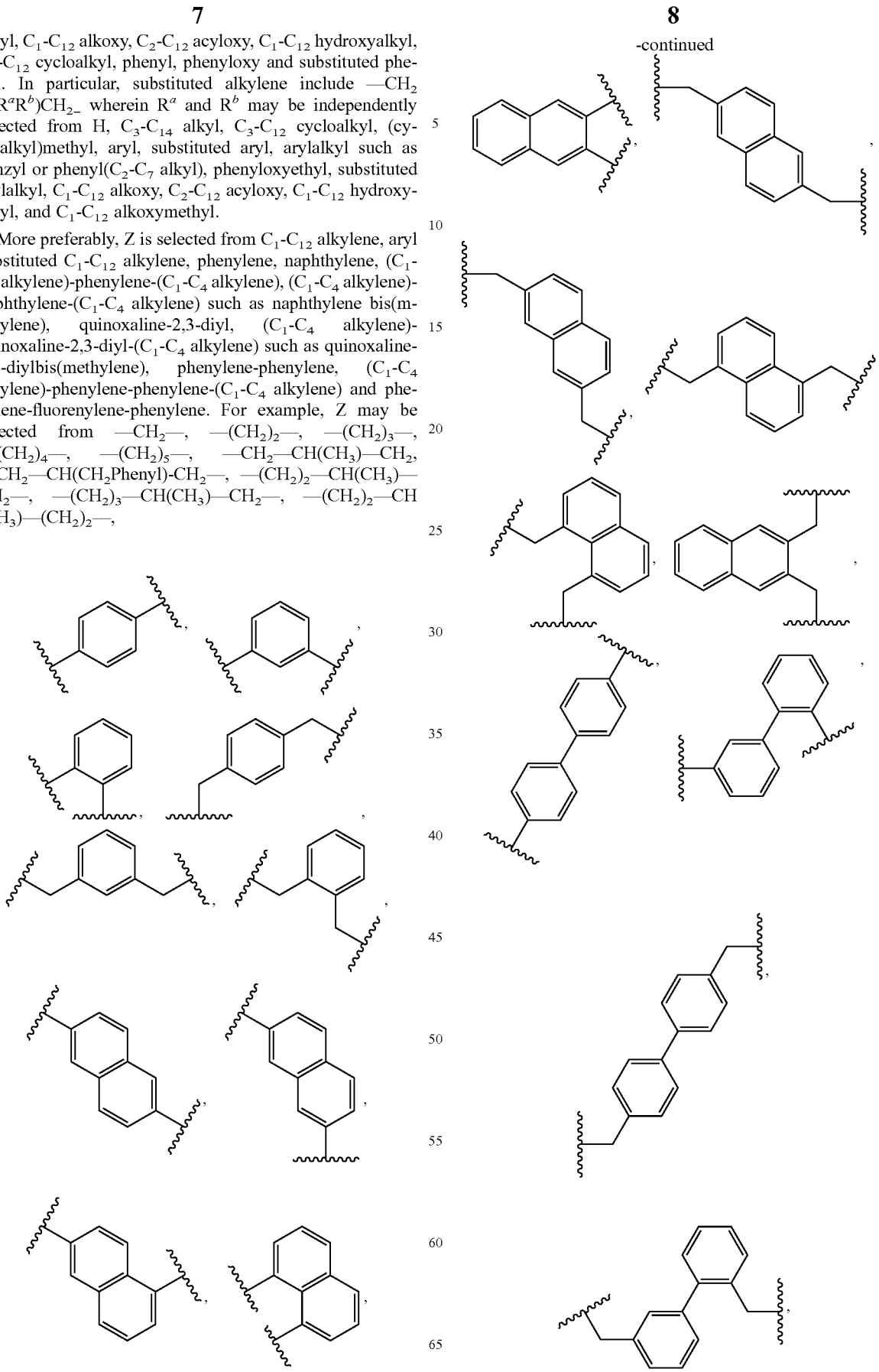

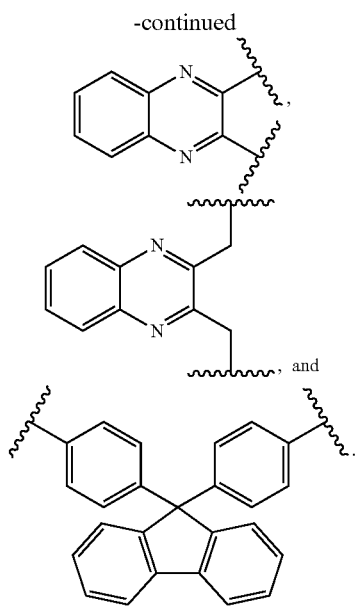
and

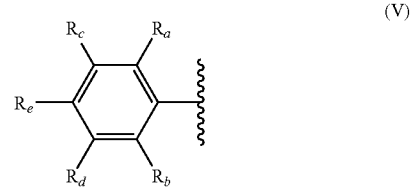

$R^3$, $R^4$, $R^5$ and $R^6$ are preferably each independently selected from $C_1$-$C_4$ alkyl, $C_1$-$C_4$ alkoxycarbonyl, alkanoyl, aroyl, nitrile, alkylsulfonyl, arylsulfonyl, aryl and heteroaryl, wherein the aryl and heteroaryl may be substituted by one or more substituents selected from $C_1$-$C_4$ alkyl and $C_1$-$C_4$ haloalkyl. Aryl, heteroaryl, substituted aryl and substituted heteroaryl are particularly preferred, and more particularly optionally substituted phenyl such as phenyl, tolyl and cumyl, because they induce a decrease of the activation potential of the compounds of the invention. Moreover, the steric hindrance provided by the presence of such substituents on the viologen cores of the compounds of the invention is believed to prevent π-π interactions between the aromatic viologen cores which is the cause of the stacking phenomenon on or near the electrode surface. For example, $R^3$, $R^4$, $R^5$ and $R^6$ may be independently selected from methyl, ethoxycarbonyl, phenyl, p-methylphenyl and p-trifluoromethylphenyl, preferably from phenyl, p-methylphenyl and p-trifluoromethylphenyl.

n, p, q and r are each independently an integer from 0 to 4, wherein when n, p, q and r are two or more, each of the $R^3$, each of the $R^4$, each of the $R^5$ or each of the $R^6$ may be identical or different. Preferably, n and r are 0 when at least one of p and q is an integer from 1 to 4, and conversely p and q are 0 when at least one of n and r is an integer from 1 to 4. In a preferred embodiment, n and r are 0 and p and q are 2. In such an embodiment the two $R^3$ substituents, respectfully the two $R^4$ substituents, are identical. The two $R^3$ substituents, respectfully the two $R^4$ substituents are preferably located meta to each other and are all ortho position relative to the central core Z. Moreover, the $R^3$ substituents may be similar or different from the $R^4$ substituents. In another embodiment, n, p, q and r are 0.

The counterion $X^-$ may be any anion that maintains electric neutrality of the viologen compounds of formula (I) or (II). $X^-$ is preferably selected from halide, preferably fluoride and chloride, tetrafluoroborate, tetraphenylborate, hexafluorophosphate, nitrate, methanesulfonate, trifluoromethane sulfonate, toluene sulfonate, hexachloroantimonate, bis(trifluoromethanesulfonyl)imide, perchlorate, acetate, sulfate and mixtures thereof.

In formula (I), $R^1$ and $R^2$ are independently selected from optionally substituted phenyl groups. The inventors have observed that the presence of phenyl groups results in the stabilization of the compounds of the invention and, consequently, in a decrease of the activation potential, which corresponds to an increase of the reduction potential, of the viologen compounds. Optionally substituted phenyl groups are represented by formula (V):

$$\text{(V)}$$

wherein $R_a$, $R_b$, $R_c$, $R_d$ and $R_e$ are each independently selected from:
H, halogen, cyano, nitro, alkyl, haloalkyl, haloalkoxy, (haloalkoxy)alkyl, arylalkyl, cycloalkyl, (cycloalkyl)alkyl and (heterocycloalkyl)alkyl, alkenyl, alkynyl, allyl, vinyl, aryl, substituted aryl, heteroaryl, substituted heteroaryl, —N(aryl)$_2$, —N(aryl)CO(aryl), —CO-aryl and —CO-substituted aryl;
—OR$^{19}$, —SR$^{19}$, —S(O)R$^{19}$, —S(O$_2$)R$^{19}$, —S(O$_2$)NR$^{19}$R$^{20}$, —NR$^{19}$R$^{20}$, NR$^{19}$COR$^{20}$, —NR$^{19}$CO(aryl), —NR$^{19}$aryl, —CH$_2$OR$^{19}$, —CH$_2$SR$^{19}$, —CH$_2$R$^{19}$, —CO—R$^{19}$ and —CO$_2$R$^{20}$ wherein R$^{19}$ and R$^{20}$ are independently selected from H, alkyl, haloalkyl, arylalkyl, cycloalkyl, cycloalkylalkyl and heterocycloalkylalkyl;
—S(O$_2$)NR$^{21}$R$^{22}$ and —NR$^{21}$R$^{22}$, wherein R$^{21}$ and R$^{22}$ form together with the nitrogen atom to which they are linked a saturated 5 to 7 membered heterocycloalkyl which may comprising in addition to the nitrogen atom one further heteroatom selected from oxygen, nitrogen and sulfur, and which may be optionally substituted by one or two groups, identical or different, selected from halogen, —R$^{19}$, —OR$^{19}$, and —NR$^{19}$R$^{20}$, wherein R$^{19}$ and R$^{20}$ are as defined above;
—V—W—R$^{23}$ wherein:
V is selected from oxygen, —N(R$^{19}$)—, sulfur, —S(O)— and —S(O$_2$)— wherein R$^{19}$ is as defined above;
W is alkylene, which may be substituted by a group selected from halogen and alkoxy; and
R$^{23}$ is selected from —OR$^{19}$, —NR$^{19}$ (alkyl) and —SR$^{19}$ wherein R$^{19}$ is as defined above; and
OC(O)—R$^{24}$ wherein R$^{24}$ is selected from alkyl, haloalkyl, alkenyl, —W—R$^{23}$, and aryl group which may be substituted by 1 to 4 groups selected from halogen, —R$^{19}$, —OR$^{19}$, —SR$^{19}$, —NR$^{19}$R$^{20}$, —NR$^{21}$R$^{22}$, —CO—R$^{19}$, —CO$_2$R$^{19}$, wherein R$^{19}$, wherein R$^{19}$, R$^{20}$, R$^{21}$, R$^{22}$, R$^{23}$ and W are as defined above.

In particular, $R_a$, $R_b$, $R_c$, $R_d$ and $R_e$ may be independently selected from H, halogen, cyano, nitro, hydroxyl, alkyl, preferably $C_4$-$C_{12}$ alkyl, haloalkyl, alkoxy, haloalkoxy, alkylthio, acyl, aroyl, alkoxycarbonyl, cycloalkyl, allyl, aryl, benzyl, and heteroaryl. In a particular embodiment, at least one of $R_a$, $R_b$, $R_c$, $R_d$ and $R_e$ is not H. Preferably, at least one of $R_a$, $R_b$, $R_c$, $R_d$ and $R_e$ is selected from halogen, cyano, nitro, hydroxyl, haloalkyl, haloalkoxy, alkoxycarbonyl, allyl, aryl and heteroaryl. Indeed, the inventors have found that such electron-withdrawing substituents stabilize the radical cation which results in a decrease of the activation potential. In a preferred embodiment, $R_e$ is H and at least one of $R_a$, $R_b$, $R_c$ and $R_d$ is not H, preferably at least one of $R_a$ and $R_b$ is not H.

In a preferred variant, in particular in the case where $R_1$ and $R_2$ are chosen to be different, $R_e$ is H and at least one of $R_a$, $R_b$, $R_c$ and $R_d$ is not H, and may be independently selected from halogen, cyano, nitro, hydroxyl, $C_1$-$C_{12}$ alkyl, haloalkyl, alkoxy, haloalkoxy, alkoxycarbonyl, cycloalkyl, allyl, aryl and heteroaryl.

In another variant, then $R_e$ is H and at least one of $R_a$, $R_b$, $R_c$ and $R_d$ is not H, and may be independently selected from halogen, cyano, hydroxyl, $C_4$-$C_{12}$ alkyl, haloalkyl, alkoxy, haloalkoxy, alkoxycarbonyl, cycloalkyl, allyl, and heteroaryl.

For example, at least one of $R_a$, $R_b$, $R_c$, $R_d$ and $R_e$ may be selected from methyl, i-propyl, t-butyl, cyano, trifluoromethoxy, preferably trifluoromethoxy. Thus, $R^1$ and $R^2$ may be independently selected from:

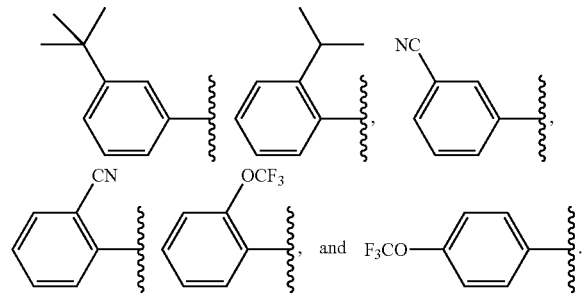

In a preferred embodiment, $R^1$ and $R^2$ are independently selected from substituted phenyl groups of formula (VI):

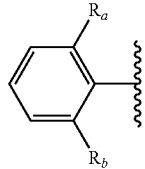

(VI)

wherein $R_a$ and $R_b$ are as defined above provided that at least one of $R_a$ and $R_b$ is not H. In particular, $R^1$ and $R^2$ may be selected from:

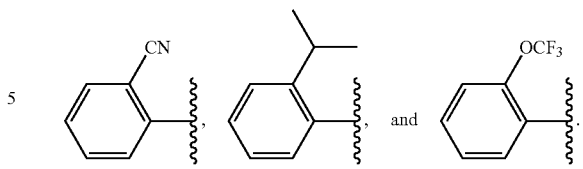

In formula (II), A and B are preferably respectively selected from nitrogen and —$N^+(R^{7a})$—, and from nitrogen and —$N^+(R^{7b})$—, wherein $R^{7a}$ and $R^{7b}$ are independently selected from $C_6$-$C_8$ alkyl, in particular n-hexyl, and phenyl or naphthyl, wherein phenyl and naphthyl may be both substituted by one or more substituents independently selected from halogen, cyano, nitro, hydroxy, $C_1$-$C_4$ alkyl, $C_1$-$C_4$ haloalkyl, $C_1$-$C_4$ alkoxy, $C_1$-$C_4$ haloalkoxy, $C_1$-$C_4$ alkylthio, $C_1$-$C_4$ haloalkylthio, $C_3$-$C_7$ cycloalkyl, ($C_3$-$C_7$ cycloalkyl)$C_1$-$C_4$ alkyl.

In particular, A and B may be independently selected from —$N^+(C_6$-$C_8$ alkyl)-, preferably —$N^+(C_6H_{13})$—, more preferably —$N^+(n$-$C_6H_{13})$—. The corresponding compounds have a good solubility in conventional solvents used in electrochromic compositions such as propylene carbonate while maintaining a fast fading rate to the bleached state. Indeed, $C_1$-$C_5$ alkyl substituted viologen compounds are more difficult to solubilise in some solvents used in electrochromic compositions like some ionic liquids. On the contrary, higher alkyl substituted two-core viologen compounds have good solubility. However, when two-core viologen compounds are substituted with long chain alkyls having more than 8 carbon atoms, the fading rate tends to decrease, which prevents a fast reversibility to the bleached state.

Also, the inventors have observed that the presence of aryl substituents, in particular phenyl substituents, on the viologen cores of compounds of the present invention results in the stabilization of the compounds of the invention and, consequently, in a decrease of the activation potential, which corresponds to an increase in the reduction potential of the viologen compounds. Therefore, in a preferred embodiment, A and B may be respectively selected from nitrogen and —$N^+(R^{7a})$—, and from nitrogen and —$N^+(R^{7b})$—, wherein $R^{7a}$ and $R^{7b}$ are independently selected from optionally substituted phenyl groups represented by formula (V) as defined above, preferably represented by formula (VI) as defined above.

In a particularly preferred embodiment, the viologen derivatives of formulae (I) and (II) are selected from the group consisting of:

| Compound | Formula |
|---|---|
| I-1 | (structure with two phenyl-N⁺ pyridinium rings, 2 BF₄⁻) |
| I-2 | (structure with two methylphenyl-N⁺ pyridinium rings, 2 PF₆⁻) |

-continued
| Compound | Formula |
|---|---|
| I-3 | 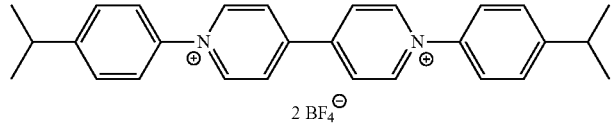
2 BF$_4^\ominus$ |
| I-4 | 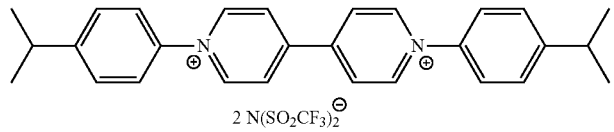 [SMILES: CC(C)c1ccc(-[n+]2ccc(-c3cc[n+](-c4ccc(C(C)C)cc4)cc3)cc2)cc1]
2 N(SO$_2$CF$_3$)$_2^\ominus$ |
| I-5 | 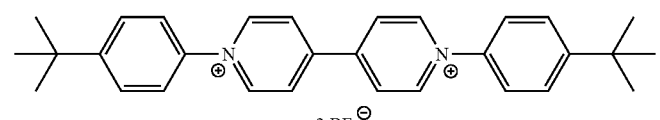
2 BF$_4^\ominus$ |
| I-6 | 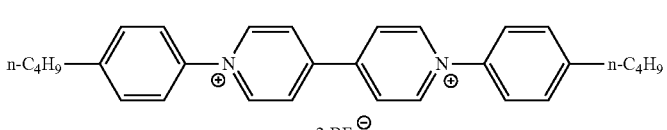
2 BF$_4^\ominus$ |
| I-7 | 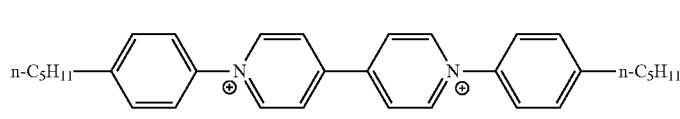
2 BF$_4^\ominus$ |
| I-8 | 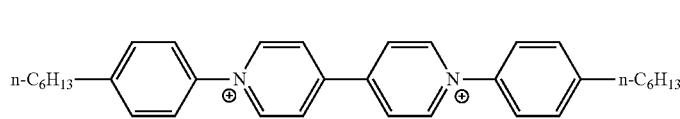
2 BF$_4^\ominus$ |
| I-9 | 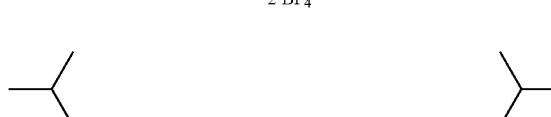
2 BF$_4^\ominus$ |
| I-10 | 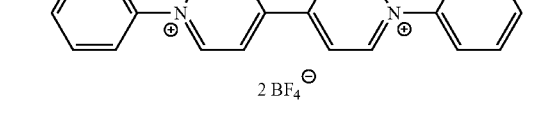
2 BF$_4^\ominus$ |
| I-11 | 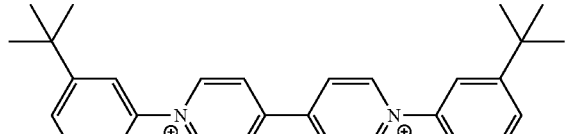
2 BF$_4^\ominus$ |

-continued
| Compound | Formula |
|---|---|
| I-12 | 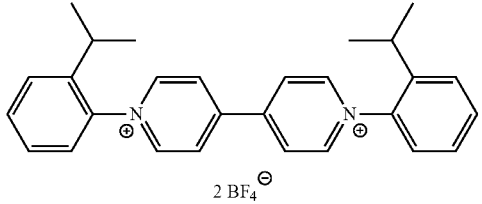<br>2 BF₄⁻ |
| I-13 | 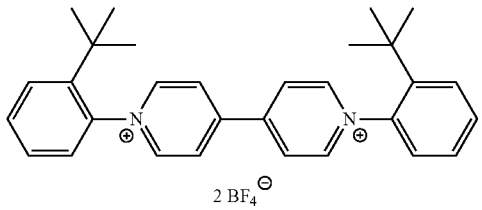<br>2 BF₄⁻ |
| I-14 | 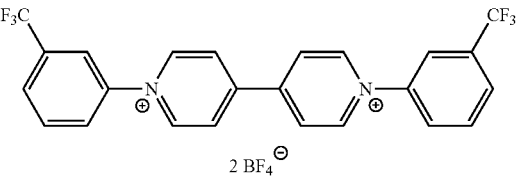<br>2 BF₄⁻ |
| I-15 | 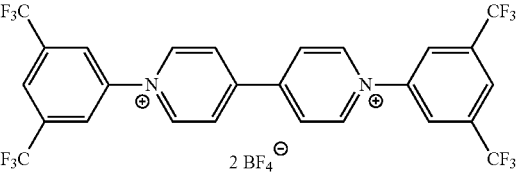<br>2 BF₄⁻ |
| I-16 | 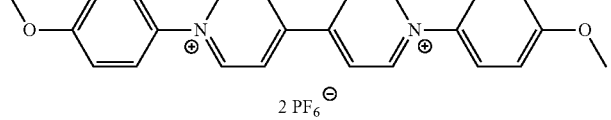<br>2 PF₆⁻ |
| I-17 | 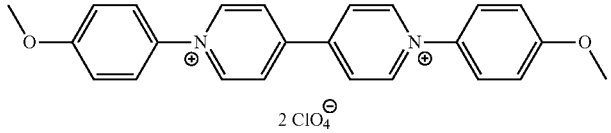<br>2 ClO₄⁻ |
| I-18 | 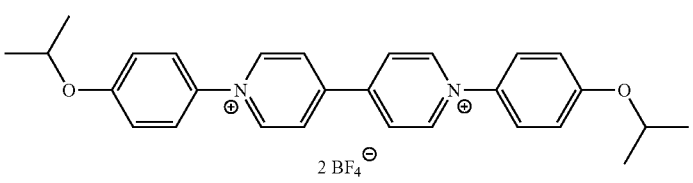<br>2 BF₄⁻ |
| I-19 | 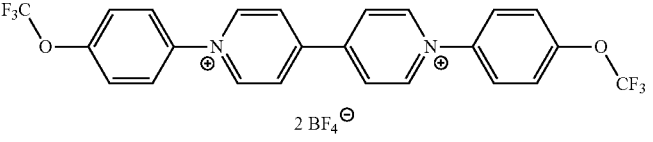<br>2 BF₄⁻ |

-continued
| Compound | Formula |
|---|---|
| I-20 | 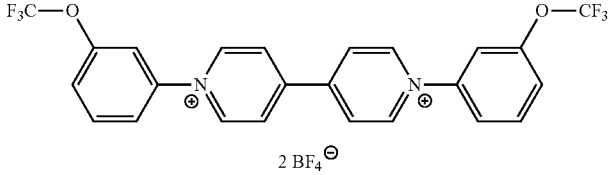<br>2 BF$_4^\ominus$ |
| I-21 | 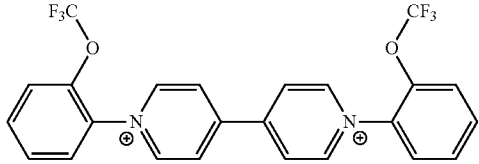<br>2 BF$_4^\ominus$ |
| I-22 | 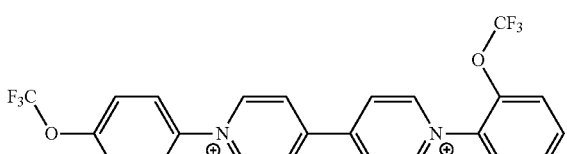<br>2 BF$_4^\ominus$ |
| I-23 | 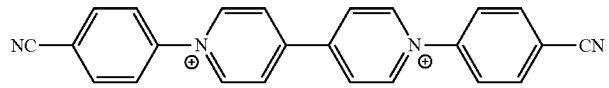<br>2 BF$_4^\ominus$ |
| I-24 | 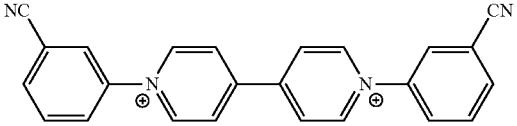<br>2 BF$_4^\ominus$ |
| I-25 | 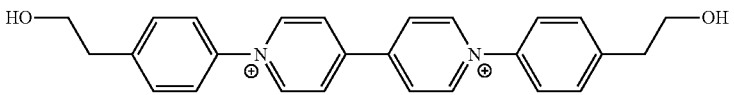<br>2 BF$_4^\ominus$ |
| I-26 | 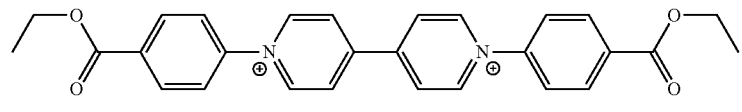<br>2 BF$_4^\ominus$ |
| I-27 | 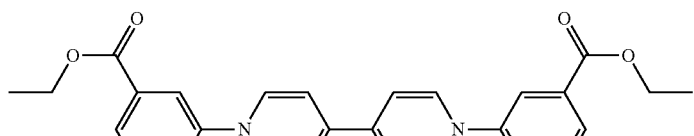<br>2 BF$_4^\ominus$ |

-continued

| Compound | Formula |
|---|---|
| I-28 | (structure: diethyl 2,2'-(4,4'-([4,4'-bipyridine]-1,1'-diium-1,1'-diyl)bis(4,1-phenylene))diacetate), 2 BF₄⁻ |
| I-29 | (structure: diethyl (2E,2'E)-3,3'-(4,4'-([4,4'-bipyridine]-1,1'-diium-1,1'-diyl)bis(4,1-phenylene))diacrylate), 2 BF₄⁻ |
| I-30 | (structure: 1,1'-bis(4-benzylphenyl)-[4,4'-bipyridine]-1,1'-diium), 2 BF₄⁻ |
| I-31 | (structure: 1,1'-bis(3-benzylphenyl)-[4,4'-bipyridine]-1,1'-diium), 2 BF₄⁻ |
| I-32 | (structure: 1,1'-bis(2-benzylphenyl)-[4,4'-bipyridine]-1,1'-diium), 2 BF₄⁻ |
| I-33 | (structure: 1,1'-bis(3-(2-oxopyrrolidin-1-yl)phenyl)-[4,4'-bipyridine]-1,1'-diium), 2 BF₄⁻ |
| I-34 | (structure: 1-(2-isopropylphenyl)-1'-phenyl-[4,4'-bipyridine]-1,1'-diium), 2 BF₄⁻ |

-continued
| Compound | Formula |
|---|---|
| I-35 | 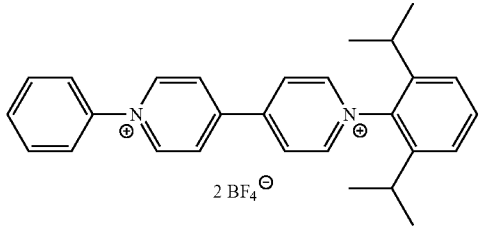 [SMILES: CC(C)c1cccc(C(C)C)c1-[n+]1ccc(-c2cc[n+](-c3ccccc3)cc2)cc1] 2 BF$_4^\ominus$ |
| I-36 | 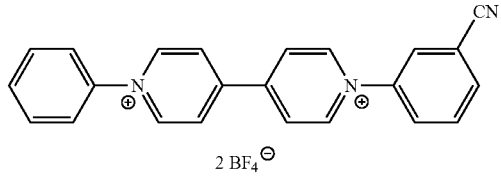 2 BF$_4^\ominus$ |
| I-37 | 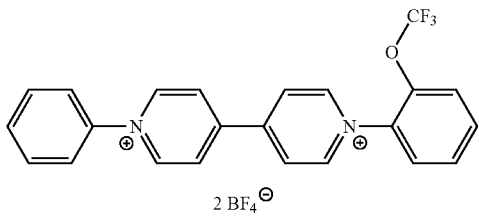 [SMILES: FC(F)(F)Oc1ccccc1-[n+]1ccc(-c2cc[n+](-c3ccccc3)cc2)cc1] 2 BF$_4^\ominus$ |
| I-38 | 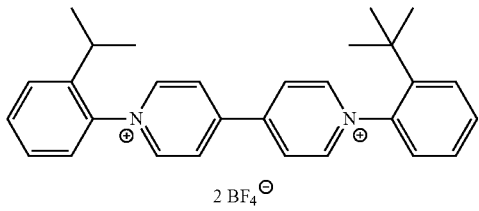 2 BF$_4^\ominus$ |
| I-39 | 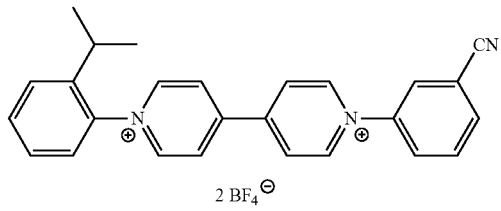 2 BF$_4^\ominus$ |
| I-40 | 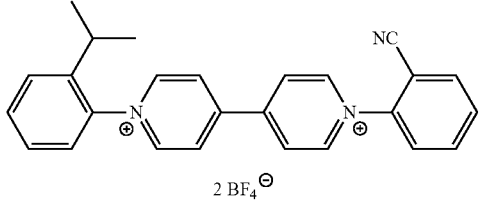 [SMILES: CC(C)c1ccccc1-[n+]1ccc(-c2cc[n+](-c3ccccc3C#N)cc2)cc1] 2 BF$_4^\ominus$ |
| I-41 | 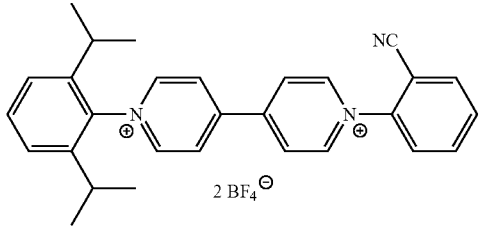 [SMILES: CC(C)c1cccc(C(C)C)c1-[n+]1ccc(-c2cc[n+](-c3ccccc3C#N)cc2)cc1] 2 BF$_4^\ominus$ |

-continued

| Compound | Formula |
|---|---|
| I-42 | [structure: 1-(2-tert-butylphenyl)-1'-(3-cyanophenyl)-4,4'-bipyridinium, 2 BF$_4^\ominus$] |
| I-43 | [structure: 1-(2-tert-butylphenyl)-1'-(2-cyanophenyl)-4,4'-bipyridinium, 2 BF$_4^\ominus$] |
| I-44 | [structure: 1-(2-isopropylphenyl)-1'-(2-trifluoromethoxyphenyl)-4,4'-bipyridinium, 2 BF$_4^\ominus$] |
| I-45 | [structure: 1-(2-isopropylphenyl)-1'-(2-chlorophenyl)-4,4'-bipyridinium, 2 BF$_4^\ominus$] |
| I-46 | [structure: 1-(2-isopropylphenyl)-1'-(2,6-dichlorophenyl)-4,4'-bipyridinium, 2 BF$_4^\ominus$] |
| I-47 | [structure: 1-(2-tert-butylphenyl)-1'-(2,4-dinitrophenyl)-4,4'-bipyridinium, 2 BF$_4^\ominus$] |
| I-48 | [structure: 1-(4-methoxyphenyl)-1'-(3-cyanophenyl)-4,4'-bipyridinium, 2 BF$_4^\ominus$] |

-continued
| Compound | Formula |
|---|---|
| I-49 | 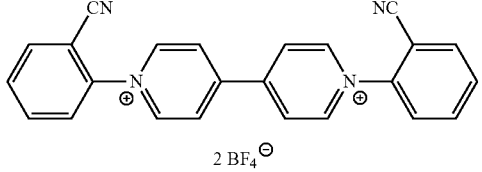 |
| I-50 | 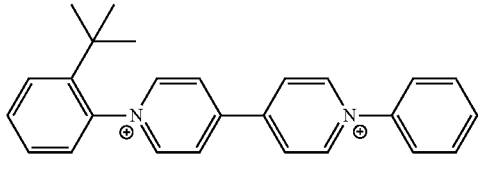 |
| III-1 | 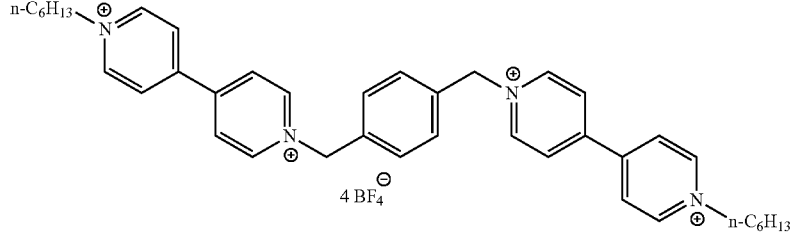 |
| III-2 |  |
| III-3 | 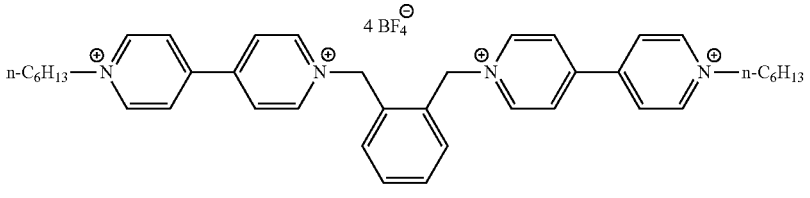 |
| III-4 | 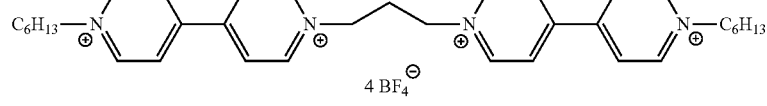 |
| III-5 | 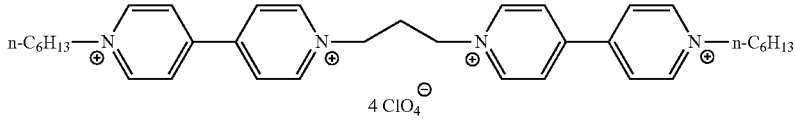 |
| III-6 | 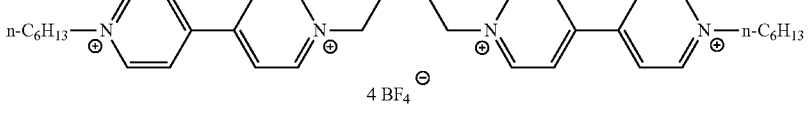 |

-continued
| Compound | Formula |
|---|---|
| III-7 | 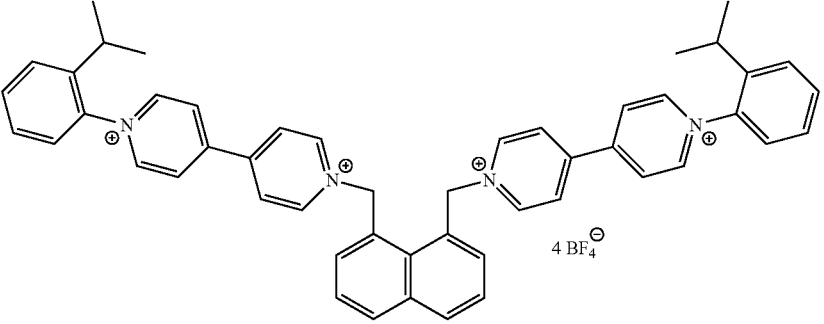 [SMILES: CC(C)c1ccccc1-[n+]1ccc(-c2cc[n+](Cc3cccc4cccc(C[n+]5ccc(-c6cc[n+](-c7ccccc7C(C)C)cc6)cc5)c34)cc2)cc1] |
| III-8 | 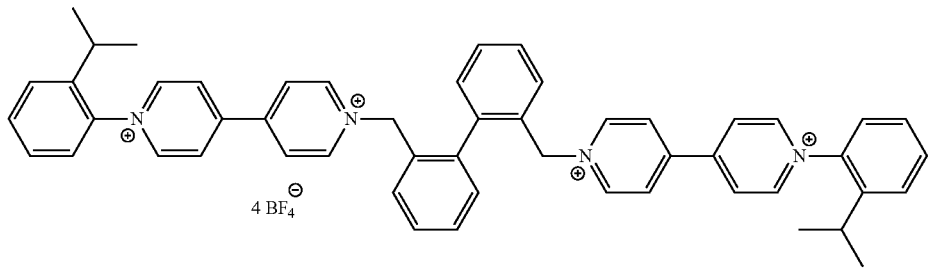 [SMILES: CC(C)c1ccccc1-[n+]1ccc(-c2cc[n+](Cc3ccccc3-c3ccccc3C[n+]3ccc(-c4cc[n+](-c5ccccc5C(C)C)cc4)cc3)cc2)cc1] |
| III-9 | 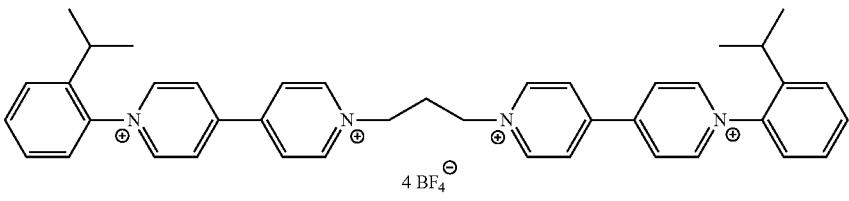 |
| III-10 | 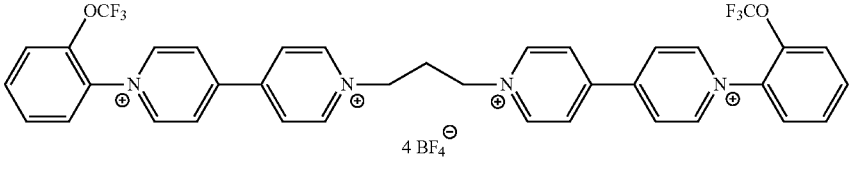 |
| III-11 | 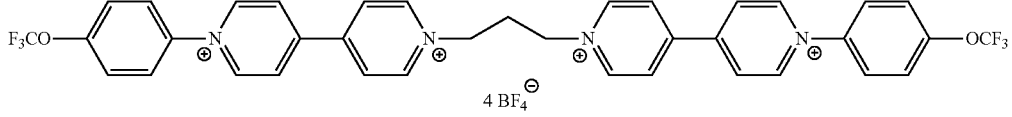 |
| III-12 | 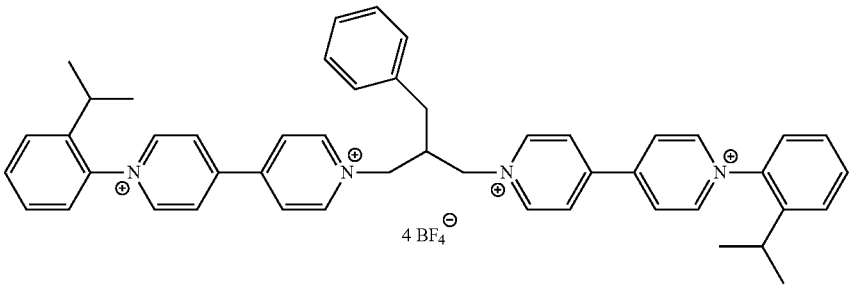 [SMILES: CC(C)c1ccccc1-[n+]1ccc(-c2cc[n+](CC(Cc3ccccc3)C[n+]3ccc(-c4cc[n+](-c5ccccc5C(C)C)cc4)cc3)cc2)cc1] |

| Compound | Formula |
|---|---|
| III-13 | 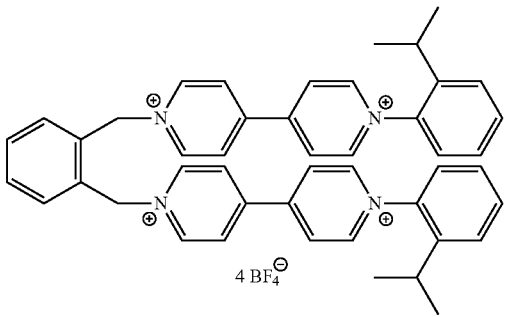 [SMILES: CC(C)c1ccccc1-[n+]1ccc(-c2cc[n+](Cc3ccccc3C[n+]3ccc(-c4cc[n+](-c5ccccc5C(C)C)cc4)cc3)cc2)cc1] |
| III-14 | 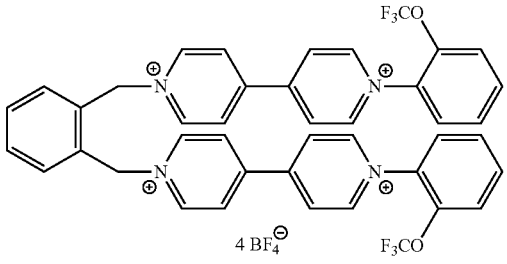 [SMILES: FC(F)(F)Oc1ccccc1-[n+]1ccc(-c2cc[n+](Cc3ccccc3C[n+]3ccc(-c4cc[n+](-c5ccccc5OC(F)(F)F)cc4)cc3)cc2)cc1] |
| III-15 | 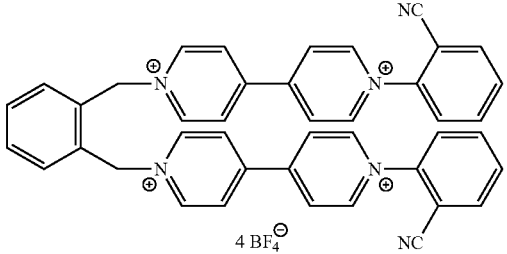 |
| III-16 | 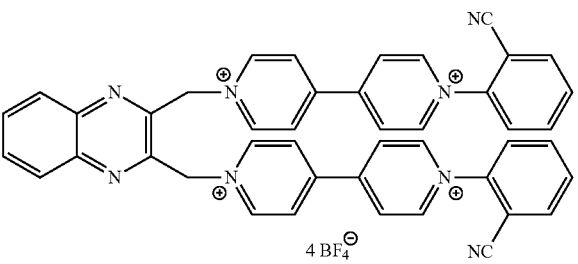 |
| III-17 | 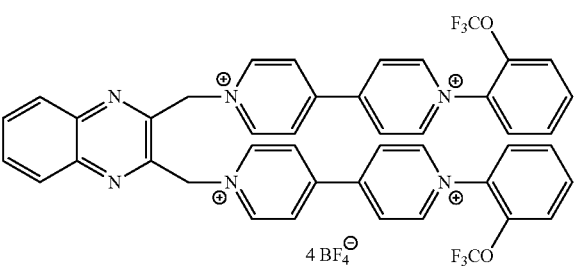 [SMILES: N#Cc1ccccc1-[n+]1ccc(-c2cc[n+](Cc3nc4ccccc4nc3C[n+]3ccc(-c4cc[n+](-c5ccccc5C#N)cc4)cc3)cc2)cc1] |

-continued

| Compound | Formula |
|---|---|
| III-18 | |
| III-19 | |
| IV-1 | |
| IV-2 | |
| IV-3 | |
| IV-4 | |

-continued

| Compound | Formula |
|---|---|
| IV-5 | |
| IV-6 | |
| IV-7 | |
| IV-8 | |
| IV-9 | |
| IV-10 | |
| IV-11 | |

-continued
| Compound | Formula |
|---|---|
| IV-12 | 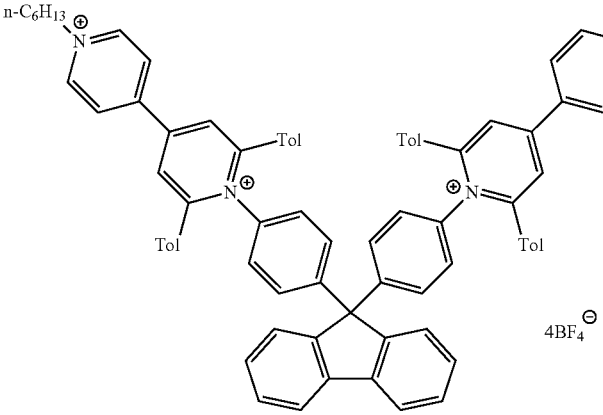 |
| IV-13 | 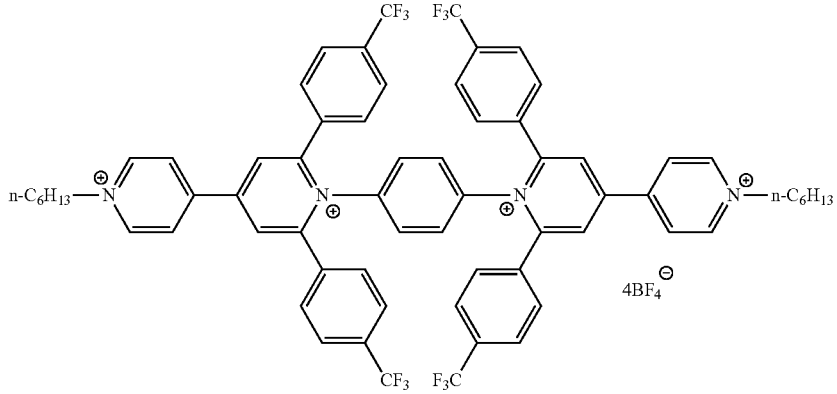 |
| IV-14 | 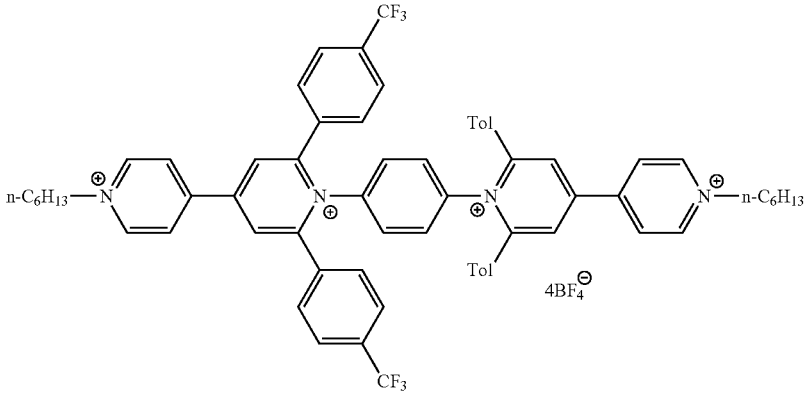 |
Me represents methyl; Ph represents phenyl; Tol represents 4-methylphenyl In a first embodiment, at least one of the viologen derivatives present in the composition is selected from compounds of formula (I). Compounds of formula (I) generally have a green or blue-green colour in their coloured state or visible light absorbing state. However, Applicant found that compounds of formula (I) wherein $R^1$ and $R^2$ are independently selected from substituted phenyl groups of formula (VI) as defined above can provide a wide range of colours in the low visible wavelength—i.e. blue or green coloured state—, while presenting good stability and close oxydo-reduction potential values to other compounds of formulae (I) and (II). Indeed, the Applicant found that the presence of a substituent in the ortho position of the phenyl group results in a hypsochromic effect compared to the meta position, which itself provides a hypsochromic effect compared to the para position. Indeed the maximum wavelength $\lambda_{max}$ in the absorption spectrum for a similar compound is higher when the substituent is in the para position of the phenyl group, than in the meta position, and a fortiori than in the ortho position.

Preferred compounds of formula (I) are compounds I-1 to I-50 defined above.

In a second embodiment, at least one of the viologen derivatives present in the composition is selected from compounds of formula (III):

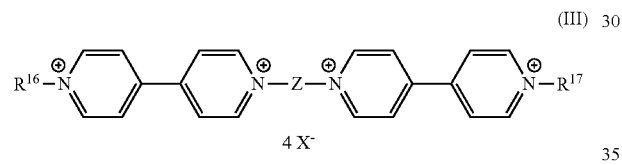

4 X⁻ wherein Z, and X⁻ are as defined in formula (II), and $R^{16}$ and $R^{17}$ are selected from alkyl and optionally substituted phenyl groups.

In particular, $R^{16}$ and $R^{17}$ may be independently selected from optionally substituted phenyl groups of formula (V) defined above. Alternatively, $R^{16}$ and $R^{17}$ may be independently selected from substituted phenyl groups of formula (VI) as defined above. Such compounds can provide colours in the low visible wavelength, while presenting good stability and close oxydo-reduction potential values to other compounds of formulae (I) and (II).

Preferred compounds of formula (III) are compounds III-1 to III-18 defined above.

In a third embodiment, at least one of the viologen derivatives present in the composition is selected from compounds of formula (IV):

(IV)

![formula IV structure]

m X⁻ wherein $R^4$, $R^5$, Z, A, B, m and X⁻ are as defined in formula (II) and at least one of $R^4$ and $R^5$ is not H.

Z is preferably selected from alkylene and arylene; more preferably, Z is selected from phenylene and naphtylene.

A and B are preferably independently selected from nitrogen and —N⁺(alkyl)-. In particular, compounds of formula (IV) wherein A and B are nitrogen can provide colours in the high visible wavelength—i.e. yellow and red—, while presenting good stability and close oxydo-reduction potential to other compounds of formulae (I) and (II).

Preferably, $R^4$ and $R^5$ are independently selected from optionally substituted aryl; more preferably, $R^4$ and $R^5$ are independently selected from optionally substituted phenyl.

Preferred compounds of formula (IV) are compounds IV-1 to IV-14 defined above.

Compounds of formulae (I), (II), (III) and (IV) can be obtained through various methods well known in the art. Suitable methods are described for example in EP 13184771.7 and EP 13184780.8. In particular Compounds of formula IV in which A and B are nitrogen, and X is tetrafluoroborate can be prepared by a method comprising the step of reacting a 2,6-disubstituted-4-[(1H)-pyridinium-4-yl]pyrylium bis(tetrafluoroborate) (1) with a diamine (2):

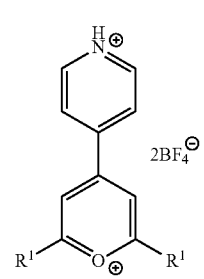

1

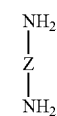

2 wherein Z, and $R^1$ are as defined above.

The use of a single 2,6-disubstituted-4-[(1H)-pyridinium-4-yl]pyrylium bis(tetrafluoroborate) (1) results in symmetrically substituted two-cores viologen derivatives (3) of formula (I-3) wherein A and B are nitrogen, and $R^1$ and $R^2$ are identical. Through a control the amount of the diamine (2) and a subsequent reaction with a second 2,6-disubstituted-4-[(1H)-pyridinium-4-yl]pyrylium bis(tetrafluoroborate) (1'), unsymmetrically substituted two-cores viologen derivatives (3') of formula (IV) wherein A and B are nitrogen, and $R^1$ and $R^2$ are different, can be obtained as shown on scheme A.

Scheme A

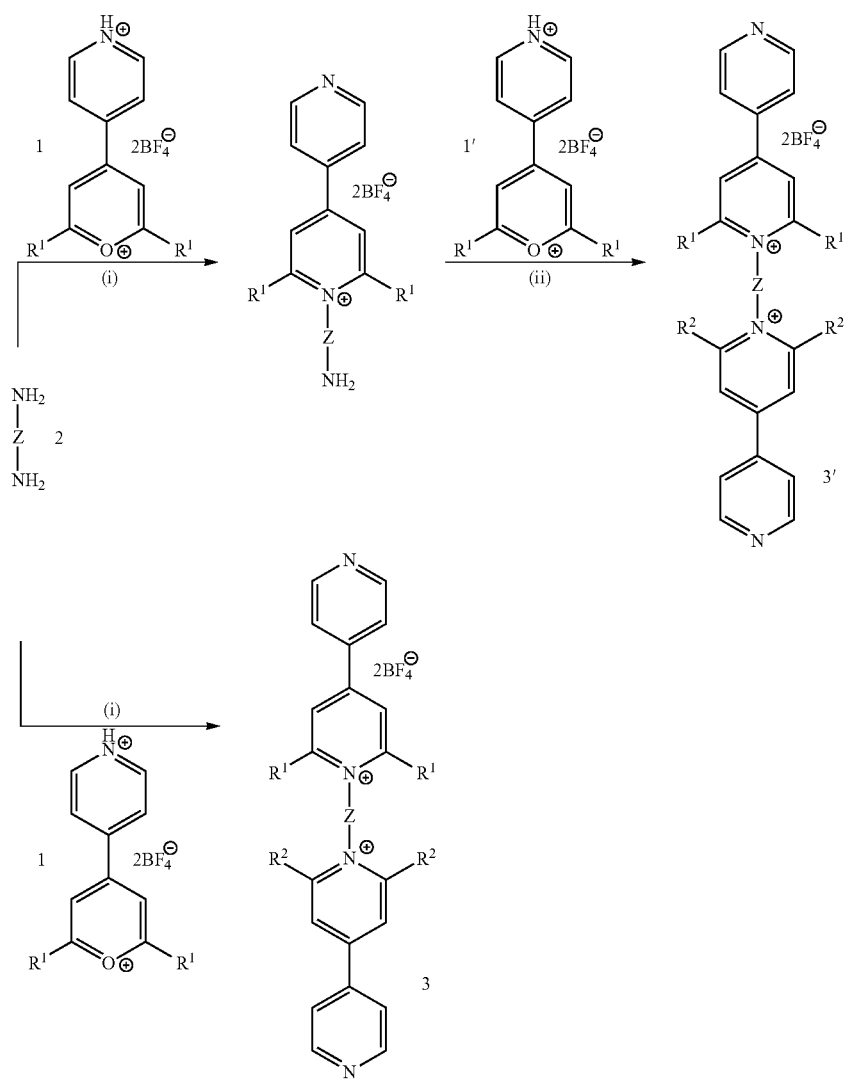

Steps (i) and (ii) disclosed in scheme A may be achieved under heat, for example from 70 to 90° C., in an alcohol and in the presence of a base.

Compounds of formula (IV) wherein A and/or B are respectively —$N^+(R^{7a})$— and —$N^+(R^{7b})$— as defined above can be obtained from the corresponding compounds (3) or (3') using suitable reaction step well known in the art. For example, compounds of formula (IV) wherein A and/or B are —$N^+$(alkyl)- can be obtained through an N-alkylation of the corresponding compound (3) or (3') with a suitable haloalkane.

The 2,6-disubstituted-4-[(1H)-pyridinium-4-yl]pyrylium bis(tetrafluoroborate) (1) may be prepared according to various methods well known in the art. For example, 4-(4-pyridyl)-1,5-disubstituted-1,5-diketones can be obtained by the condensation of pyridine-4-carboxaldehyde and substituted acetophenones (see for example Aryl-substituted Derivatives of 4,4'-Bipyridylium Salts: their Spectroscopic Properties and Stereochemistry, J. E. Downes, *J. Chem. Soc.* (C), 1967, 1491 and Pyrylogens: Synthesis, Structural, Electrochemical, and Photophysical Characterization of a New Class of Electron Transfer Sensitizers, E. L. Clennan, C. Liao, E. Ayokosok, *J. Am. Chem. Soc.*, 2008, 130, 7552). The cyclisation of the 4-(4-pyridyl)-1,5-disubstituted 1,5-diketones can be readily accomplished by, for example, heating in glacial acetic acid containing trans-chalcone and boron trifluoride etherate to give the 2,5-disubstituted 4-[(1H)-pyridinium-4-yl]pyrylium bis(tetrafluoroborates) (1).

In a preferred embodiment, the composition of the invention comprises at least one viologen derivative of formula (I) and at least one viologen derivative of formula (III), preferably at least one viologen derivative of formula (III) wherein $R^{16}$ and $R^{17}$ are independently selected from optionally substituted phenyl groups, more preferably substituted phenyl groups of formula (VI), as defined above.

In this preferred embodiment, a particularly low visible light absorption is obtained in the bleached state, i.e. the non-activated state, which is very useful for the manufacture of an optical article, more particularly of an ophthalmic lens, which is usually sought to be uncoloured in the bleached state.

According to the present invention a lens is regarded as "low visible light absorbing" if its Tv is higher than 70%, preferably higher than 80%.

In another preferred embodiment, the composition of the invention comprises at least one viologen derivative of formula (I), and at least one viologen derivative of formula (IV), preferably at least one viologen derivative of formula (IV) wherein A and B are nitrogen, as defined above.

In still another preferred embodiment, the composition of the invention comprises at least one viologen derivative of formula (III), preferably at least one viologen derivative of formula (III) wherein $R^{16}$ and $R^{17}$ are independently selected from optionally substituted phenyl groups, more preferably substituted phenyl groups of formula (VI), and at least one viologen derivative of formula (IV), preferably at least one viologen derivative of formula (IV) wherein A and B are nitrogen, as defined above.

One or more additional oxidizing electrochromic compounds can be added to the composition of the invention so as to further adapt the colour or the intensity of the coloured state of the composition. Said additional compound can be other compounds of formula (I) or (II), or a different compound. For example, the additional oxidizing electrochromic compound can be selected from other viologen derivatives such as alkylviologens, arylviologens, arylalkylviologens, alkylarylviologens, or anthraquinone and derivatives.

In a particular embodiment, the composition of the invention comprises at least three viologen derivatives of formula (I) or (II). For example, the composition of the invention may comprise at least one viologen derivative of formula (I), at least one viologen derivative of formula (III), preferably at least one viologen derivative of formula (III) wherein $R^{16}$ and $R^{17}$ are independently selected from optionally substituted phenyl groups, more preferably substituted phenyl groups of formula (VI), and at least one compound of formula (IV), preferably at least one viologen derivative of formula (IV) wherein A and B are nitrogen, as defined above.

All the oxydo-reduction potentials of the electrochromic oxidizing compounds present in the electrochromic composition should have similar oxydo-reduction potentials. Preferably, the oxydo-reduction potentials of the electrochromic oxidizing compounds differ from each other from less than 0.2 V, more preferably from less than 0.15 V, still more preferably from less than 0.1 V, even more preferably from less than 0.05 V. Since the oxydo-reduction potentials of the electrochromic oxidizing compounds comprised in the composition are very close, said compounds can change colour simultaneously when a potential is applied to the composition, and the "chameleon effect" occurring when electrochromic compounds change colour all one by one can be prevented.

The reducing compound of the composition of the present invention is not particularly limited. The reducing compound is not necessary an electrochromic compound however it should be chosen among compounds having at least the following properties: low absorption of visible light in the bleached state if the reducing compound is also an electrochromic compound, good stability, in particular to oxygen, good ageing performance, and good solubility in conventional electrochromic solvents. Whether or not the reducing compound used in the electrochromic composition of the invention has electrochromic properties, the wide range of colours available among compounds of formulae (I) and (II) allows obtaining the desired colour for the electrochromic composition when activated, possibly taking into account the colour of the reducing compound in its coloured state, if any.

The reducing compound can be selected from:
ferrocene and their derivatives such as ethyl ferrocene, t-butyl ferrocene,
phenoxazine and their derivatives, such as N-benzylphenoxazine,
phenazine and their derivatives, such as 5,10-dihydrophenazine, N,N,N',N'-tetramethyl-p-phenylenediamine,
phenothiazine and their derivatives, such as 10-methylphenothiazine and isopropylphenothiazine,
thioanthrene, and
tetrathiafulvalene.

Accordingly, the reducing compound may be selected from phenothiazine derivatives of formula (VII):

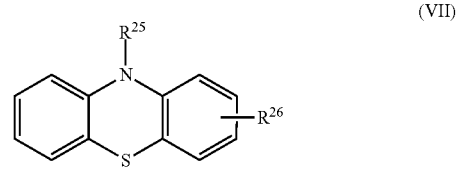

(VII)

wherein $R^{25}$ is independently selected from H, alkyl, preferably $C_1$-$C_6$ alkyl, $C_1$-$C_6$ heteroalkyl, $C_6$-$C_{14}$ aryl and substituted aryl, preferably phenyl and phenyl substituted by one or more substituents selected from halogen, $C_1$-$C_4$ alkyl, $C_1$-$C_4$ heteroalkyl and $C_1$-$C_4$ haloalkyl, and benzyl and substituted benzyl, preferably phenylbenzyl and $R^{26}$ is selected from the group consisting of H, $C_1$-$C_4$ haloalkyl, preferably trifluoromethyl, $C_1$-$C_4$ alkoxy, preferably methoxy, and optionally substituted aryl, preferably optionally substituted phenyl.

The composition of the invention may comprise a fluid, mesomorphous or gel host medium in which the electrochromic compounds are preferably dissolved. The fluid or mesomorphous host medium is preferably selected from the group consisting of organic solvents, liquid crystals, polymers or liquid crystal polymers and mixtures thereof.

Suitable solvents are redox-inert solvents which cannot react with the electrochromic compounds of the composition. Examples of suitable solvents are ethylene carbonate, propylene carbonate, γ-butyrolactone, γ-valerolactone, acetonitrile, propionitrile, benzonitrile, glutaronitrile, methylglutaronitrile, dimethylformamide, N-methylpyrrolidone, sulfolane, 3-methyl sulfolane, benzene, toluene, methyl ethyl ketone, acetone, ethanol, tetrahydrofurfuryl alcohol, 2-methoxyethyl ether, xylene, cyclohexane, 3-methylcyclohexanone, ethyl acetate, ethyl phenylacetate, tetrahydrofuran, methanol, methyl propionate, ethylene glycol ethylene carbonate, ionic liquids, and mixtures thereof. Preference is given to carbonate and particularly propylene carbonate.

The liquid crystal medium that may be used in the present invention includes, without being limited to, such materials as nematic or chiral nematic media.

The concentration of the oxidizing compounds in the composition depends on the desired absorption of the electrochromic composition in the coloured state (i.e activated state). The concentration of the oxidizing compounds is typically from 0.001 to 0.5 M, preferably from 0.01 to 0.3 M, more preferably from 0.05 to 0.25 M. The ratio between each of the oxidizing compounds can be easily determined by the skilled person according to the colour of the electrochromic composition to be obtained.

The concentration of the reducing compound in the composition can be from 0.001 to 0.5 M, preferably from 0.01 to 0.3 M, more preferably from 0.05 to 0.25 M.

The composition of the invention may further comprise an inert current-carrying electrolyte. The inert current-carrying electrolyte should be compatible with the other components of the composition. In particular, the inert current-carrying electrolyte should not react with the electrochromic compounds. Examples of inert current-carrying electrolyte include alkali metal salts, lithium, sodium or tetraalkylammonium salts, aluminium chloride and aluminium boride, persulfates and bis(fluorosulfonyl)imide. The inert current-carrying electrolyte is preferably selected from sodium, lithium and tetraalkylammonium, ions in combination with inert anion selected preferably from chloride, tetrafluoroborate and perchlorate. Other examples of inert anions are tetraphenylborate, cyano-triphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate or hexafluorosilicate. Most preferred inert current-carrying electrolyte is tetra-n-butylammonium tetrafluoroborate (TBA $BF_4^-$). When present in the electrochromic composition, the concentration of the inert current-carrying electrolyte is typically from 0.005 to 2 M, preferably from 0.01 to 1 M, more preferably from 0.05 to 0.5 M.

The electrochromic composition of the invention may comprise other additives such as thickening or gelling agents. The thickening or gelling agent should be inert to the other components of the composition, should be electrochemically stable and should not decreased significantly the conductivity of the electrochromic composition. Examples of thickening or gelling agents include acrylic polymers such as polymethylmethacrylate (PMMA) or others polyacrylates, polyvinylacetate, polyurethanes, polystyrene, polyacetonitrile, cellulose derivatives such as carboxymethylcellulose, hydroxymethylcellulose, cellulose propionate or hydroxypropylmethylcellulose, gums or hydrocolloids such as gellan, carrageenan, pullulan, polyethylene oxide, polypropylene oxide, polyvinyl acetate, poly(N-vinyl pyrrolidone), and polyvinylidene fluoride. The concentration of the thickening or gelling agent will depend on the nature of the thickening agent and the viscosity desired for the electrochromic composition. Typically, the content of the thickening or gelling agent may be from 1 to 30 wt %, preferably from 3 to 20 wt %, more preferably from 5 to 15 wt % of the electrochromic composition.

Suitable further additives for the electrochromic medium for the occasionally desired protection against UV light (<350 nm) are UV absorbers. Examples are 2,4-dihydroxybenzophenone (UVINUL® 3000, BASF), 2-hydroxy-4-n-octyloxybenzophenone (SANDUVOR® 3035, Clariant), 2-(2H-benzotriazol-2-yl)-6-dodecyl-4-methylphenol (Tinuvin® 571, Ciba), 2,2'-dihydroxy-4-methoxy-benzophenone (Cyasorb 24$^{SM}$, American Cyanamid Company), ethyl 2-cyano-3,3-diphenylacrylate (UVINUL® 3035, BASF 2-ethylhexyl 2-cyano-3,3-diphenyl-acrylate (UVINUL® 3039, BASF), 2-ethylhexyl p-methoxycinnamate (UVINUL® 3088, BASF), 2-hydroxy-4-methoxy-benzophenone (CHIMASSORB® 90, Ciba), dimethyl 4-methoxybenzylidenemalonate (SANDUVOR® PR-25, Clariant).

Preferably, all the components of the composition, other than electrochromic compounds, are essentially transparent to visible light so that when the electrochromic compounds are in their bleached state, the composition appears to be essentially transparent to visible light.

The present invention also relates to an electrochromic device, in particular an optical article, comprising the composition of the invention. In a preferred embodiment the electrochromic device of the invention comprises an electrochromic composition having a neutral colour in the coloured state.

The electrochromic device may be selected from an optical article such as optical lens or an optical filter, a window, a visor, a mirror and a display, in particular a segmented or matrix display. Preferably, the electrochromic device of the invention is an optical lens, more preferably an ophthalmic lens. Non-limiting examples of ophthalmic lens include corrective and non-corrective lenses, including single vision or multi-vision lenses, which may be either segmented or non-segmented, as well as other elements used to correct, protect, or enhance vision, including without limitation contact lenses, intra-ocular lenses, magnifying lenses and protective lenses or visors. Non-limiting examples of display elements and devices include screens and monitors. Non-limiting examples of windows include automotive, marine and aircraftwindows, filters, shutters, and optical switches.

The device may contain functional layers such as polarizing layers, photochromic layer, anti-reflecting coatings, visible light and UV absorbing coatings, impact-resistant coatings, abrasion-resistant-coating, anti-smudge-coating, anti-fog coating, anti-dust coating, all of which are familiar to the skilled person. The electrochromic device of the invention may comprise a mechanism for holding the composition in a mechanically stable environment. For example, the electrochromic device of the invention comprises an electrochromic cell including two substrates facing each other. The substrates are preferably optical substrate such as any mineral or organic glass commonly known and used in the optical field. It may be sodocalcic or borosilicate mineral glass for instance. It may be a thermoplastic resin such as a thermoplastic polycarbonate, or a thermoset or photo-cured resin such as polyurethane or polythiourethane. In case where the electrochromic device is used as an ophthalmic lens, the substrates used for manufacturing the cell may have a spherical shape or aspheric shape. The internal sides of the substrates may be coated with transparent conductive electrodes ("TCO"). The conductive electrodes may be formed of a transparent conductive material such as, for example indium tin oxide ("ITO"), fluorine-doped in oxide ("FTO"). The sheet resistance of these TCO must be below 100 ohm/square, preferably below 40 ohm/square, and even preferably below 10 ohm/square. The substrates may be held at fixed distance from each other, for example with a spacer of 10 μm to 200 μm, preferably of 20 to 150 μm, and more preferably of 75 μm, in order to form a gap wherein the electrochromic composition is introduced.

Another device of the present invention comprises an optical component provided with at least one transparent cell arrangement juxtaposed in a parallel direction to the surface thereof, as disclosed in WO 2006/013250, each cell being tightly closed and containing said fluid, mesomorphous or gel host medium and said at least one compound of the present invention. Other devices according to the invention can be a device as described in FR 2937154 or FR2950710 comprising at least one compound of the invention.

BRIEF DESCRIPTION OF THE DRAWING

FIG. 1—cell assembly and filling procedure.

EXAMPLES

This invention will be further illustrated by the following non-limiting examples which are given for illustrative purposes only and should not restrict the scope of the appended claims.

Evaluation of Oxido-Reduction Potential and Colour of the Compounds Used for the Preparation of the Electrochromic Composition:

The oxido-reduction potentials of the compounds were measured by a method of cyclic voltammetry with 3 electrodes.

The 3 electrodes used were:
1 Platinum working electrode
1 Platinum auxiliary or counter electrode
1 Platinum reference electrode which is immersed into a solution consisting of 0.01M $AgNO_3$+0.1M TBAP (tetrabutylamonium perchlorate) in acetonitrile.

The potential values indicated were the first reduction potential for the compounds, with regards to the standard hydrogen reference electrode (SHE).

The analyzed solution comprised 0.01M of the compound to be analyzed and 1M of TBAP salt.

The scan rate of the potential was fixed to 100 mV/s.

The colour of the analyzed compounds was evaluated with a solution comprising 0.01M of the compound to be analyzed, 0.02M Phenothiazine (Phtz) or 10-Methylphenothiazine (Mephtz) and 1M of TBAP salt in propylene carbonate as solvent.

This solution was introduced into a quartz tank where at least one glass electrode coated with Indium Tin Oxide (ITO) is placed in order to colour the analyzed compound on this electrode.

The reducing agent (phenothiazine for all compounds except compounds, III-3, III-10 and III-11 using 10-methylphenothiazine) coloured on another glass electrode coated with Indium Tin Oxide (ITO).

The potential applied between both electrodes, for activating the compounds, was equal to the addition, in absolute value, of $E^1_{red}$ of the compound+$E^1_{ox}$ of phenothiazine (which is $E^1_{ox}$=0.36V) or methylphenothiazine (which is $E^1_{ox}$=0.45V).

The results for each of the synthesized compounds are indicated in Table 1 below. E1red corresponds to the first reduction potential.

The colours indicated in Table 1 to 6 is the visual colour perceived by emmetropic eyes under day light conditions.

TABLE 1

| Compound | Molecule | $E^1_{red}$ (V) | Colour |
|---|---|---|---|
| I-5 | 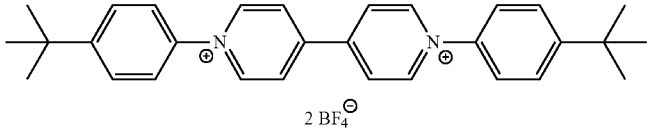 | −0.69 | green |
| I-10 | 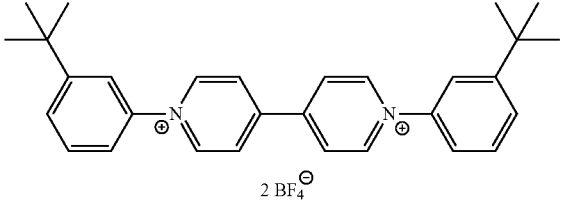 | −0.7 | green |
| III-10 | 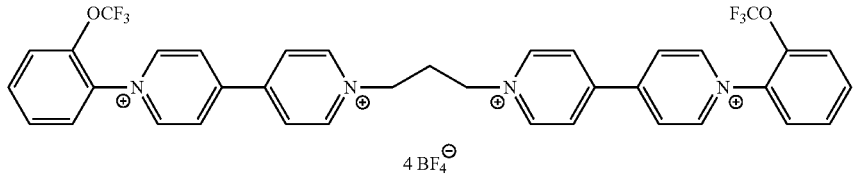 [SMILES: FC(F)(F)Oc1ccccc1-[n+]1ccc(-c2cc[n+](CCC[n+]3ccc(-c4cc[n+](-c5ccccc5OC(F)(F)F)cc4)cc3)cc2)cc1 ; "4 BF4"] | −0.64 | purple |
| III-11 | 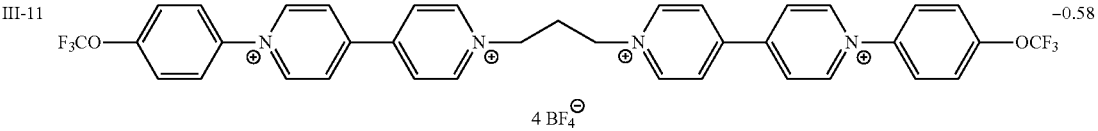 | −0.58 | purple |

1—Preparation of the Electrochromic Compositions:

Example 1

Combination of I-10 (1,1'-bis(3-(tert-butyl)phenyl)-[4,4'-bipyridinel]-1,1'-diium)bis tetrafluoroborate+III-10 (1',1'''-(Propane-1,3-diyl)bis{1-(2-(trifluoromethoxy)phenyl)-[4,4'-bipyridinel]-1,1'-diium} tetrakis(tetrafluoroborate))+MePhtz The compounds I-10, III-10 and methyphenothiazine were dissolved in a solution comprising propylene carbonate, the PMMA and the tetrabutylammonium tetrafluoroborate. At the end of this preparation step, a limpid and non or weakly visible light absorbing solution was obtained.

Table 2 indicates the amount of each compound of the electrochromic composition of Example 1, the oxydo-reduction potential of reducing compound and oxidizing compounds as well as their colour state when they are activated individually.

$E_{1red}$ corresponds to the first reduction potential and $E_{1ox}$ to the first oxidation potential. The oxydo-reduction potentials of I-10 and III-10 differ from each other from about 0.06 Volt.

TABLE 2

|  | Compound | | | | | |
|---|---|---|---|---|---|---|
|  | Solvent Propylene Carbonate (PC) | Thickening agent PMMA (Mw = 97.000 g/mol) | I-10 | III-10 | MePhtz | Electrolyte TBA BF$_4^-$ |
| Molar concentration |  |  | 0.08M | 0.014M | 0.13M | 0.13M |
| Weight percent | 82.1% | 7.8% | 3.5% | 1.1% | 2.2% | 3.3% |
| Potential (Volt) |  |  | $E_{1red\,max}$ −0.70 | $E_{1red\,max}$ −0.64 | $E_{1ox\,max}$ 0.44 |  |
| Colour at the activated state |  |  | green | purple | red |  |

The non-activated state of the composition of Example 1 was uncoloured. After activation at a potential of between 0.9 and 1.1 V, the activated state obtained was brown. The change of state was totally reversible.

Example 2

Combination of I-5 (1,1'-bis(4-(tert-butyl)phenyl)-[4,4'-bipyridinel]-1,1'-diium)bis tetrafluoroborate+III-10 (1',1'''-(Propane-1,3-diyl)bis{1-(2-(trifluoromethoxy)phenyl)-[4,4'-bipyridine]-1,1'-diium}tetrakis(tetrafluoroborate))+MePhtz Same preparation as in example 1 except that the compound I-10 was replaced by I-5.

Table 3 indicates the amount of each compound of the electrochromic composition of Example 2, the oxydo-reduction potential of reducing compound and oxidizing compounds as well as their colour state when they are activated individually.

TABLE 3

|  | Compound | | | | | |
|---|---|---|---|---|---|---|
|  | Solvent PC | Thickening agent PMMA (Mw = 97.000 g/mol) | I-5 | III-10 | MePhtz | Electrolyte TBA BF$_4^-$ |
| Molar concentration |  |  | 0.08M | 0.014M | 0.13M | 0.13M |
| Weight percent | 82.1% | 7.8% | 3.5% | 1.1% | 2.2% | 3.3% |
| Potential (Volt) |  |  | $E_{1redmax}$ −0.69 | $E_{1redmax}$ −0.64 | $E_{1oxmax}$ 0.44 |  |
| Colour at the activated state |  |  | green | purple | red |  |

The non-activated state of the composition of Example 2 was uncoloured. After activation at a potential of between 0.9 and 1.1 V, the activated state obtained was brown. The change of state was totally reversible.

Example 3

Combination of I-10 (1,1'-bis(3-(tert-butyl)phenyl)-[4,4'-bipyridinel]-1,1'-diium)bis tetrafluoroborate+III-1 (1,1'''-(Propane-1,3-diyl)bis{1-(4-(trifluoromethoxy)phenyl)-[4,4'-bipyridinel]-1,1'-diium}tetrakis(tetrafluoroborate))+MePhtz Same preparation as example 1 except that the compound III-10 was replaced by III-11. Table 4 indicates the amount of each compound of the electrochromic composition of Example 3, the oxydo-reduction potential of reducing compound and oxidizing compounds as well as their colour state when they are activated individually.

TABLE 4

| | Compound | | | | | |
|---|---|---|---|---|---|---|
| | Solvent PC | Thickening agent PMMA (Mw = 97.000 g/mol) | I-10 | III-11 | MePhtz | Electrolyte TBA BF$_4^-$ |
| Molar concentration | | | 0.08M | 0.014M | 0.13M | 0.13M |
| Weight percent | 82.1% | 7.8% | 3.5% | 1.1% | 2.2% | 3.3% |
| Potential (Volt) | | | $E_{1redmax}$ −0.69 t | $E_{1redmax}$ −0.58 | $E_{1oxmax}$ 0.44 | |
| Colour at the activated state | | | green | purple | red | |

The non-activated state of the composition of Example 3 was uncoloured. After activation at a potential of between 0.9 and 1.1 V, the activated state obtained was brown. The change of state was totally reversible.

Example 4

Combination of I-10 (1,1'-bis(3-(tert-butyl)phenyl)-[4,4'-bipyridinel]-1,1'-diium)bis tetrafluoroborate+III-10 (1',1'''-(Propane-1,3-diyl)bis{1-(2-(trifluoromethoxy)phenyl)-[4,4'-bipyridinel]-1,1'-diium}tetrakis(tetrafluoroborate))+ferrocene:

Same preparation as example 2 except that the reducing compound methyphenothiazine was replaced partially by ferrocene.

Table 5 indicates the amount of each compound of the electrochromic composition of Example 4, the oxydo-reduction potential of reducing compound and oxidizing compounds as well as their coloured state when they are activated individually.

TABLE 5

| | Compound | | | | | | |
|---|---|---|---|---|---|---|---|
| | Solvent PC | Thickening agent PMMA (Mw = 35000 g/mol) | I-10 | III-10 | Ferrocene | MePhtz | Electrolyte TBA BF4− |
| Molar concentration | | | 0.12M | 0.028M | 0.08M | 0.19M | 0.2M |
| Weight percent | 67.4% | 16.9% | 5% | 2% | 1.1% | 2.8% | 4.8% |

TABLE 5-continued

| | Solvent PC | Thickening agent PMMA (Mw = 35000 g/mol) | I-10 | III-10 | Ferrocene | MePhtz | Electrolyte TBA BF4– |
|---|---|---|---|---|---|---|---|
| Potential (Volt) | | | $E_{1redmax}$ −0.70 | $E_{1redmax}$ −0.64 | $E_{1oxmax}$ 0.12 | $E_{1oxmax}$ 0.44 | |
| Colour at the activated state | | | green | purple | uncoloured | | |

The non-activated state of the composition of Example 4 was uncoloured. After activation at a potential at 0.64 V, the activated state obtained was grey. The change of state was totally reversible.

2—Implementation of the Electrochromic Composition in an Electrochromic Device

The cell used to evaluate the electrochromic compositions included two mineral glass substrates facing each other. The internal sides of these substrates were coated with transparent conductive electrodes. The transparent conductive material used here was indium tin oxide (ITO). The substrates were held at fixed distance from one another by using spacers of 75 µm, in order to form a gap. The edge of the cell was sealed with a UV curable adhesive in such a way that an opening of 5 mm is left.

A tank was filled at room temperature and atmospheric pressure with the electrochromic composition of the present invention. The cell was placed vertically in the tank under atmospheric pressure in such way that the opening was located above the solution level. The tank with the cell was placed in a vacuum-desiccator, which was evacuated to 0.5mBar. The opening of the cell was then introduced in the solution. During the aeration of the tank under the introduction of an inert gas, for example Ar or $N_2$, the electrochromic composition filled the entire volume of the gap through the opening. The opening was then sealed with a UV curable adhesive in order to make the cell hermetic. The electrical connection is made by two silver plated copper wires, sealed on each ITO glass substrates with silver charged epoxy adhesive.

The electrical potential applied to test the electrochromic cell was monitored by a potentiostat.

The cell assembly and filling procedure used are illustrated in FIG. 1.

3—Evaluation of the Compositions (Colour, Transmittance, Stability . . . ) with Detailed Methods A series of experiments was performed on the composition obtained in Examples 1-4.

Transmission

The transmission spectra of the solution incorporating the composition of the invention was measured.

The transmission level or visual transmittance (Tv) of the lens was also measured according to the ISO Standard 8980-3, in the 380 nm-780 nm wavelength range, using a spectrophotometer. It corresponds to the transmission factor as defined in the ISO Standard 13666:1998.

The optical performance was assessed by means of transmission measurements. A lens is regarded as "low visible light absorbing" if its Tv is higher than 70%, preferably higher than 80%.

It is to be noted that the cell used for the purpose of the experiment is a basic device, and that its Tv value at the empty state, i.e. before filing with the electrochromic formulation, is only 70%. Said Tv value could be simply increased by using classical methods, for example by adding anti-reflective coating, etc. . . .

Colour

The electrochromic cell as described above was filled with the composition of Examples 1 to 4.

When a potential was applied between the electrodes of the electrochromic device, the solution/composition which was initially colourless, changes rapidly to a brown colour. The solution returned rapidly to its colourless state when the potential was removed. The potential applied for activating the solution is indicated in Table 6.

Stability/Ageing Performance

In order to study the stability of the formulation, the solutions/compositions of examples 1 to 4 were activated under an application of a potential during 40 hours. After 40 hours of application, switching off the voltage caused the colour rapidly to disappear for the examples 1 to 4.

The results of these properties for each composition are summarized in table 6.

TABLE 6

| | Visual Transmittance in bleached state (Tv) | Potential (Volt) | Colour in the activated state | Visual Transmittance in activated state (Tv) | Stability/ageing performance (40 hours) |
|---|---|---|---|---|---|
| Example 1 | 78% | 1.0 | brown | 9% | Ok |
| Example 2 | 75% | 1.0 | brown | 2% | Ok |
| Example 3 | 74% | 1.0 | brown | 3% | Ok |
| Example 4 | 75% | 0.64 | brown | 9.5% | Ok |

As can be seen from the data of Table 6, the compositions of examples 1 to 4 according to the invention in their inactive or bleached state exhibited a good transmittance in the 410-800 nm wavelength range, between 70% and 80%. When a potential was applied between the electrodes of the electrochromic device, the compositions of examples 1 to 4 according to the invention which were all initially colourless or of weakly visible light absorbing changed rapidly to a brown colour. The compositions then returned rapidly to their colourless state when the potential is removed.

The compositions of examples 1 to 4 also exhibited good stability. Indeed after 40 hours of application of a voltage, once the voltage was switched off, all the compositions of examples 1 to 4 returned rapidly to their initial clear state.

The invention claimed is:

1. An electrochromic composition comprising:
at least one reducing compound; and
at least two electrochromic oxidizing compounds, wherein said electrochromic oxidizing compounds have similar oxydo-reduction potentials, and are selected from viologen derivatives of formulae (I) and (II):

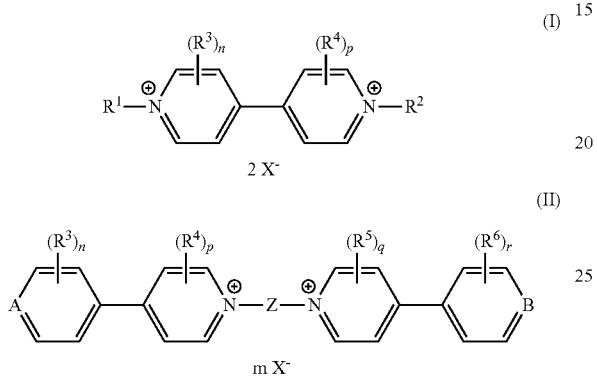

wherein:
R$^1$ and R$^2$ are each independently selected from optionally substituted phenyl groups;
R$^3$, R$^4$, R$^5$ and R$^6$ are each independently selected from H, alkyl, alkoxy, alkylthio, haloalkyl, haloalkoxy, haloalkythio, polyakylenoxy, alkoxycarbonyl, aryl, substituted aryl, heteroaryl and substituted heteroaryl, wherein the alkyl group may be substituted by one or more substituents independently selected from alkoxy, cycloalkyl, aryl, substituted aryl, heteroaryl and substituted heteroaryl;
n, p, q and r are each independently an integer from 0 to 4, wherein when n, p, q or r is two or more, each of the R$^3$, each of the R$^4$, each of the R$^5$ or each of the R$^6$ may be identical or different;
A and B are respectively selected from nitrogen and —N$^+$(R$^{7a}$)—, and from nitrogen and —N$^+$(R$^{7b}$)—, wherein R$^{7a}$ and R$^{7b}$ are independently selected from:
alkyl which may be substituted by one or more groups independently selected from halogen, alkoxy, cycloalkyl, vinyl, allyl, aryl, substituted aryl, heteroaryl and substituted heteroaryl;
aryl and heteroaryl which may be both substituted by one or more groups independently selected from: halogen, cyano, nitro, alkyl, haloalkyl, arylalkyl, cycloalkyl, cycloalkylalkyl and heterocycloalkylalkyl, alkenyl, alkynyl, allyl, vinyl, aryl, substituted aryl, heteroaryl, substituted heteroaryl, —N(aryl)$_2$, —N(aryl)CO(aryl), —CO-aryl and —CO-substituted aryl;
—OR$^8$, —S(O)R$^8$, —S(O$_2$)R$^8$, —S(O$_2$)NR$^8$R$^9$, —NR$^8$R$^9$, —NR$^8$COR$^9$, —NR$^8$CO(aryl), —NR$^8$aryl, —CH$_2$OR$^8$, —CH$_2$SR$^8$, —CH$_2$R$^8$, —CO—R$^8$ and —CO$_2$R$^8$ wherein R$^8$ and R$^9$ are independently selected from H, alkyl, haloalkyl, arylalkyl, cycloalkyl, cycloalkylalkyl and heterocycloalkylalkyl;

—S(O$_2$)NR$^{10}$R$^{11}$ and —NR$^{10}$R$^{11}$, wherein R$^{10}$ and R$^{11}$ form together with the nitrogen atom to which they are linked a saturated 5 to 7 membered heterocycloalkyl which may comprise in addition to the nitrogen atom one further heteroatom selected from oxygen, nitrogen and sulphur, and which may be optionally substituted by one or two groups independently selected from halogen, —R$^8$, —OR$^8$, and —NR$^8$R$^9$, wherein R$^8$ and R$^9$ are as defined above;
—V—W—R$^{12}$ wherein:
V is selected from oxygen, —N(R$^8$)—, sulphur, —S(O)— and —S(O$_2$)— wherein R$^8$ is as defined above;
W is alkylene, which may be substituted by one or more groups independently selected from halogen and alkoxy; and
R$^{12}$ is selected from —OR$^8$, —NR$^8$(alkyl) and —SR$^8$ wherein R$^8$ is as defined above; and
—OC(O)—R$^{13}$ wherein R$^{13}$ is selected from alkyl, haloalkyl, alkenyl, —W—R$^{12}$, and aryl group which may be substituted by 1 to 4 groups selected from halogen, —R$^8$, —OR$^8$, —SR$^8$, —NR$^8$R$^9$, —NR$^{10}$R$^{11}$, —CO—R$^8$, C(O)OR$^8$, wherein R$^8$, R$^9$, R$^{10}$, R$^{11}$, R$^{12}$ and W are as defined above;
Z is selected from:
alkylene;
cycloalkylene; and
a bivalent groups of formula —R$^{14}$—Y—R$^{15}$—, wherein:
R$^{14}$ and R$^{15}$ are each independently selected from single bond, alkylene and cycloalkylene, and
Y is selected from arylene, cycloalkylene, heteroarylene, arylene-arylene or arylene-CR'R''-arylene wherein R' and R'' form together with the carbon to which they are linked a carbocyclic group;
wherein said alkylene, cycloalkylene, arylene, heteroarylene and carbocyclic groups may be substituted by one or more substituents selected from halogen, alkyl, alkoxy, alkylthio, hydroxyalkyl, acyloxy, cycloalkyl, aryl, substituted aryl, aryloxy heteroaryl and substituted heteroaryl;
m is 2 if A and B are nitrogen, 3 if one of A and B is nitrogen and the other is not nitrogen, and 4 if both A and B are not nitrogen;
X$^-$ is a counterion;
at least one of the viologen derivatives is selected from compounds of formula (I); and
at least one of the viologen derivative is selected from compounds of formula (III) or formula (IV):

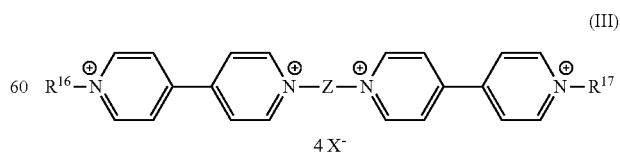

wherein Z, and X$^-$ are as defined in formula (II), and R$^{16}$ and R$^{17}$ are independently selected from substituted phenyl groups of formula (VI):

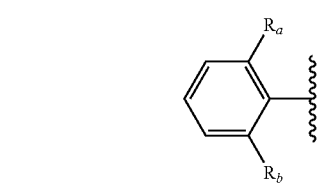

(VI)

wherein $R_a$ and $R_b$ are independently selected from H, halogen, cyano, nitro, hydroxyl, alkyl, haloalkyl, alkoxy, haloalkoxy, alkylthio, acyl, aroyl, alkoxycarbonyl, cycloalkyl, allyl, aryl, benzyl, and heteroaryl provided that at least one of $R_a$ and $R_b$ is not H

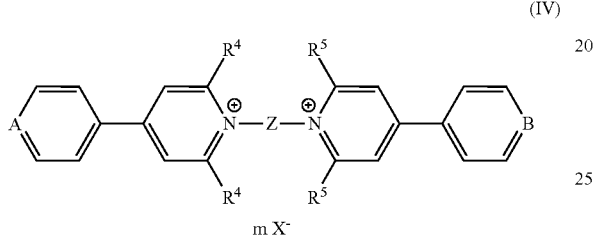

(IV)

m X⁻ wherein $R^4$, $R^5$, Z, A, B, m and X⁻ are as defined in formula (II) and at least one of $R^4$ and $R^5$ is not H.

2. The electrochromic composition according to claim 1, wherein the oxydo-reduction potentials of the electrochromic oxidizing compounds differ from each other from less than 0.2 V.

3. The electrochromic composition according to claim 2, wherein the oxydo-reduction potentials of the electrochromic oxidizing compounds differ from each other from less than 0.15 V.

4. The electrochromic composition according to claim 3, wherein the oxydo-reduction potentials of the electrochromic oxidizing compounds differ from each other from less than 0.1 V.

5. The electrochromic composition according to claim 4, wherein the oxydo-reduction potentials of the electrochromic oxidizing compounds differ from each other from less than 0.05 V.

6. The electrochromic composition according to claim 1, wherein Z is selected from $C_1$-$C_{12}$ alkylene, aryl substituted $C_1$-$C_{12}$ alkylene, phenylene, naphthylene, ($C_1$-$C_4$ alkylene)-phenylene-($C_1$-$C_4$ alkylene), ($C_1$-$C_4$ alkylene)-naphthylene-($C_1$-$C_4$ alkylene), quinoxaline-2,3-diyl, ($C_1$-$C_4$ alkylene)-quinoxaline-2,3-diyl-($C_1$-$C_4$ alkylene), phenylene-phenylene, ($C_1$-$C_4$ alkylene)-phenylene-phenylene-($C_1$-$C_4$ alkylene) and phenylene-fluorenylene-phenylene.

7. The electrochromic composition according to claim 6, wherein Z is selected from —$CH_2$—, —$(CH_2)_2$—, —$(CH_2)_3$—, —$(CH_2)_4$—, —$(CH_2)_5$—, —$CH_2$—CH($CH_3$)—$CH_2$—, —$CH_2$—CH($CH_2$Phenyl)-$CH_2$—, —$(CH_2)_2$—CH($CH_3$)—$CH_2$—, —$(CH_2)_3$—CH($CH_3$)—$CH_2$—, —$(CH_2)_2$—CH($CH_3$)—$(CH_2)_2$—,

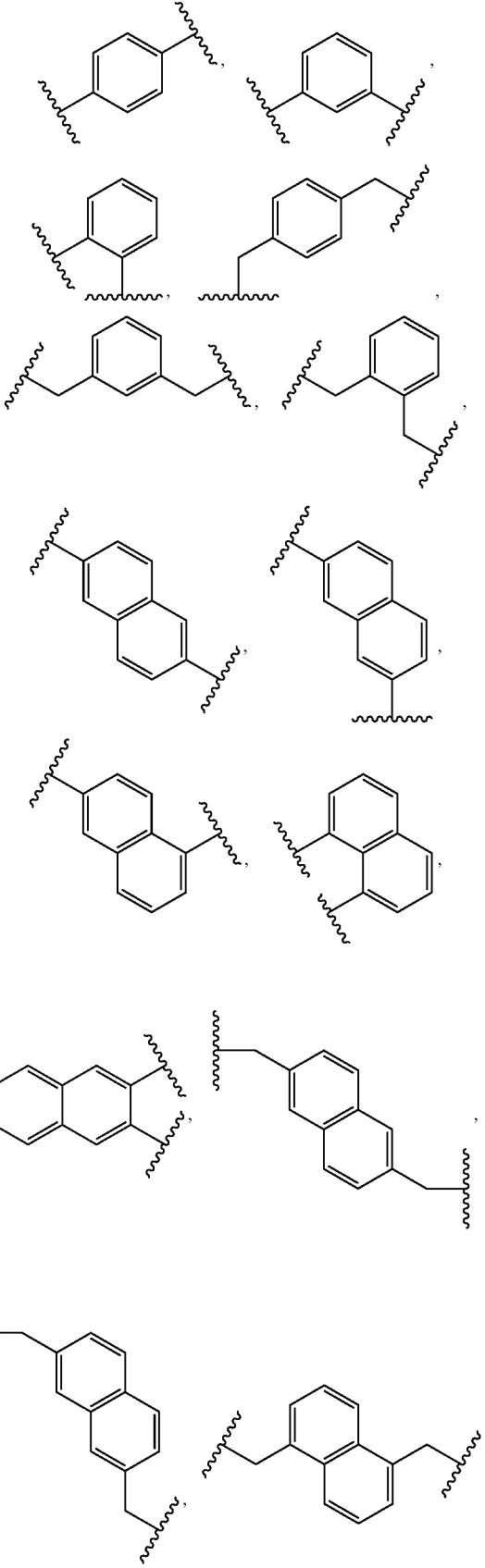

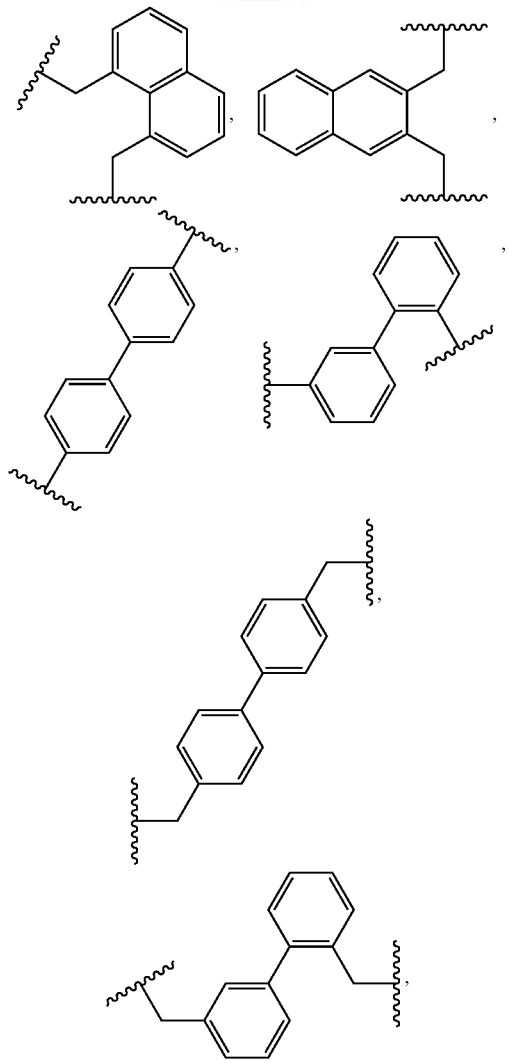

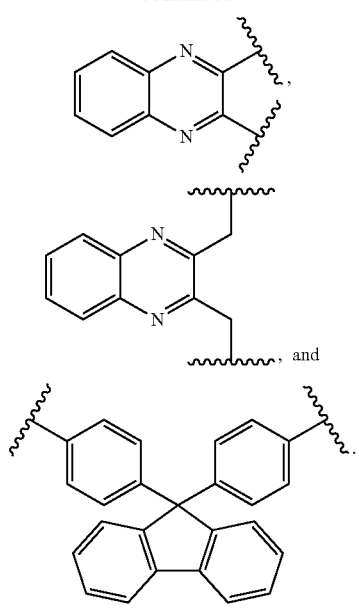

8. The electrochromic composition according to claim 1, wherein $R^3$, $R^4$, $R^5$ and $R^6$ are each independently selected from $C_1$-$C_4$ alkyl, $C_1$-$C_4$ alkoxycarbonyl, alkanoyl, aroyl, aryl and heteroaryl, and wherein the aryl and heteroaryl may be substituted by one or more substituents selected from $C_1$-$C_4$ alkyl and $C_1$-$C_4$ haloalkyl.

9. The electrochromic composition according to claim 1, wherein the counterion $X^-$ is selected from halide, tetrafluoroborate, tetraphenylborate, hexafluorophosphate, nitrate, methanesulfonate, trifluoromethane sulfonate, toluene sulfonate, hexachloroantimonate, bis(trifluoromethanesulfonyl)imide, perchlorate, acetate and sulfate.

10. The electrochromic composition according to claim 1, wherein said viologen derivatives are selected from compounds I-1 to I-50, III-7 to III-19 and IV-1 and IV-14:

| Compound | Formula |
| --- | --- |
| I-1 | (structure with 2 $BF_4^-$) |
| I-2 | (structure with 2 $PF_6^-$) |
| I-3 | (structure with 2 $BF_4^-$) |

-continued
| Compound | Formula |
|---|---|
| I-4 | 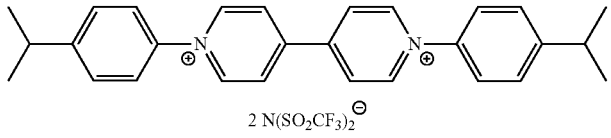
2 N(SO$_2$CF$_3$)$_2^{\ominus}$ |
| I-5 | 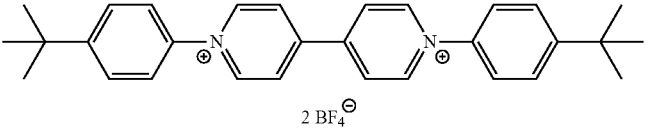
2 BF$_4^{\ominus}$ |
| I-6 | 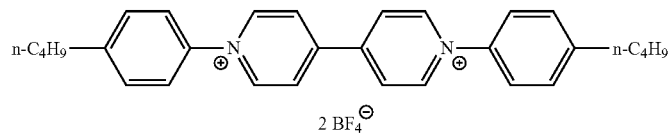
2 BF$_4^{\ominus}$ |
| I-7 | 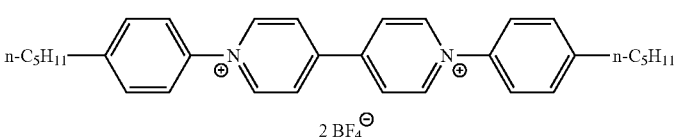
2 BF$_4^{\ominus}$ |
| I-8 | 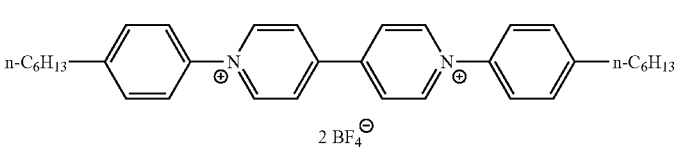
2 BF$_4^{\ominus}$ |
| I-9 | 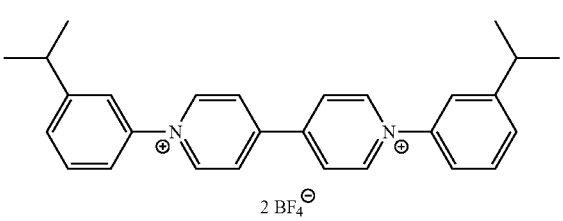
2 BF$_4^{\ominus}$ |
| I-10 | 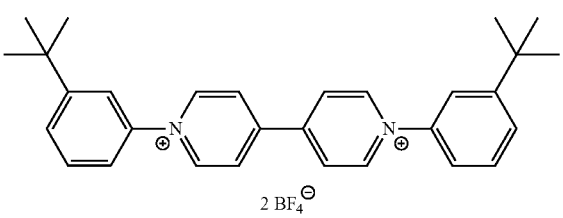
2 BF$_4^{\ominus}$ |
| I-11 | 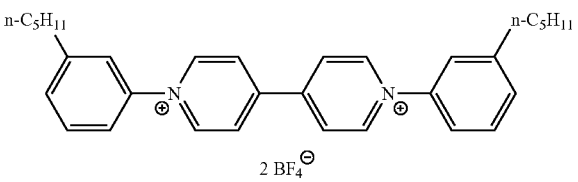
2 BF$_4^{\ominus}$ |
| I-12 | 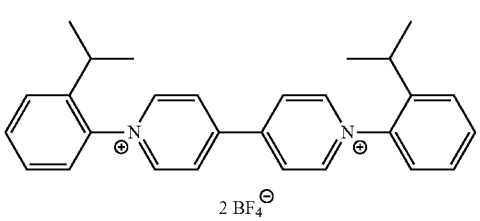
2 BF$_4^{\ominus}$ |

-continued
| Compound | Formula |
|---|---|
| I-13 | 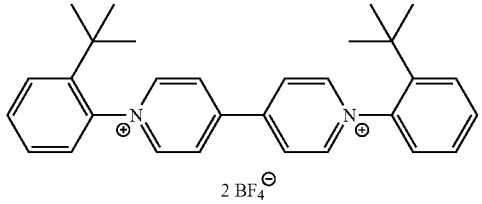<br>2 BF$_4^\ominus$ |
| I-14 | 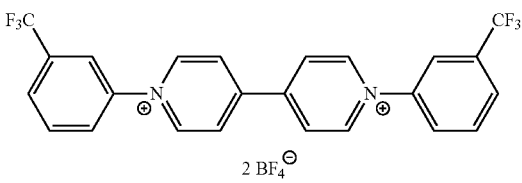<br>2 BF$_4^\ominus$ |
| I-15 | 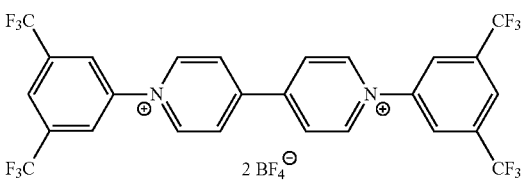<br>2 BF$_4^\ominus$ |
| I-16 | 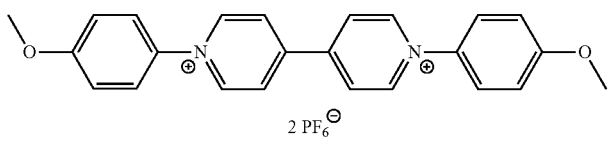<br>2 PF$_6^\ominus$ |
| I-17 | 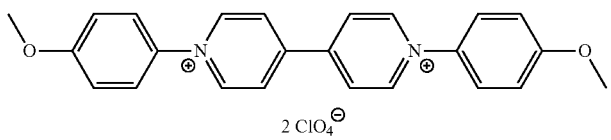<br>2 ClO$_4^\ominus$ |
| I-18 | 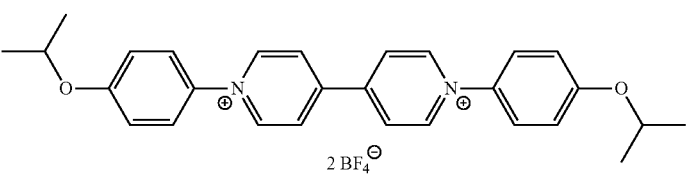<br>2 BF$_4^\ominus$ |
| I-19 | 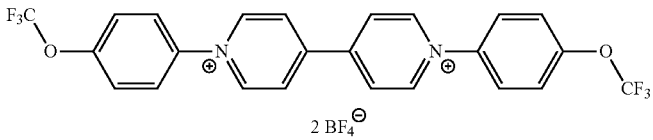<br>2 BF$_4^\ominus$ |
| I-20 | 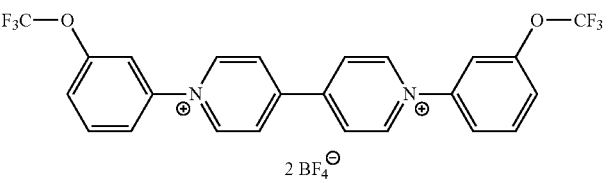<br>2 BF$_4^\ominus$ |

| Compound | Formula |
|---|---|
| I-21 | 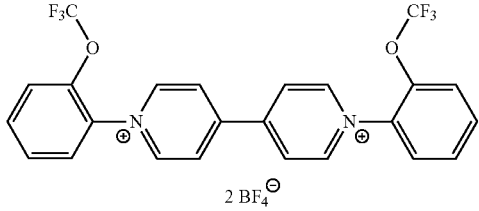 |
| I-22 | 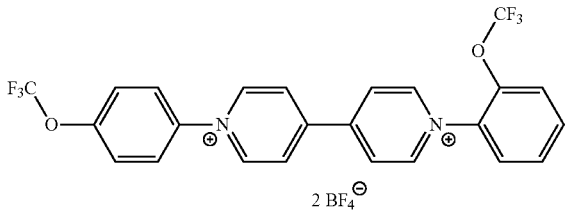 |
| I-23 | 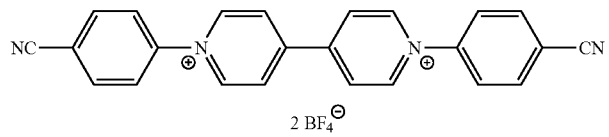 |
| I-24 | 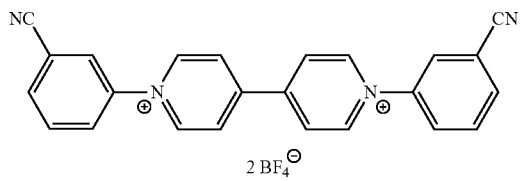 |
| I-25 | 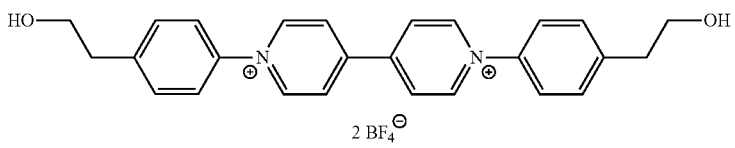 |
| I-26 | 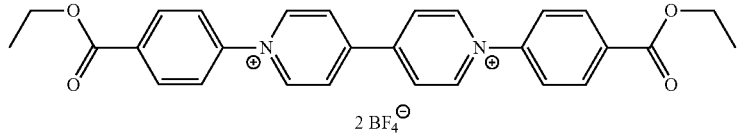 |
| I-27 | 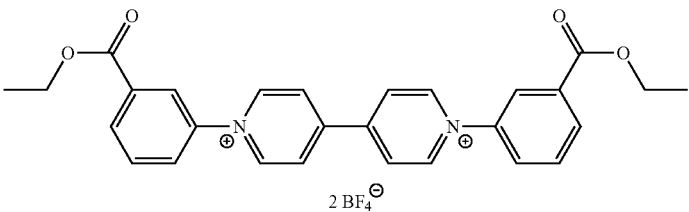 |
| I-28 | 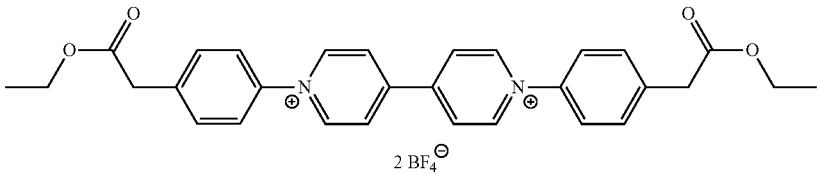 |

-continued
| Compound | Formula |
|---|---|
| I-29 | 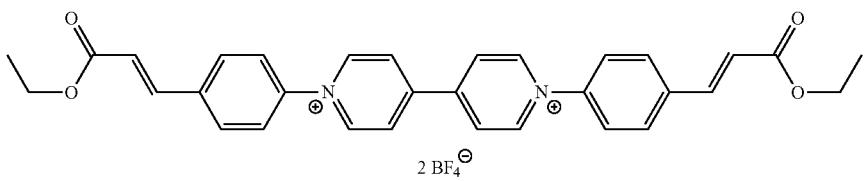<br>2 BF$_4^\ominus$ |
| I-30 | 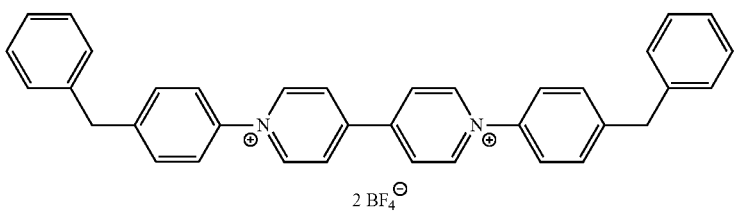<br>2 BF$_4^\ominus$ |
| I-31 | 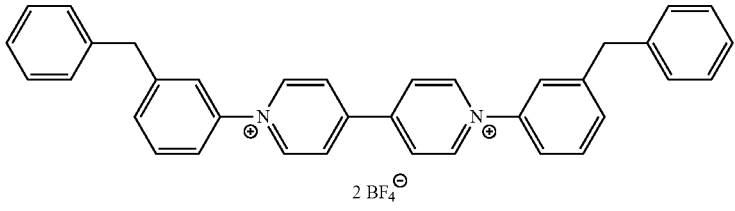<br>2 BF$_4^\ominus$ |
| I-32 | 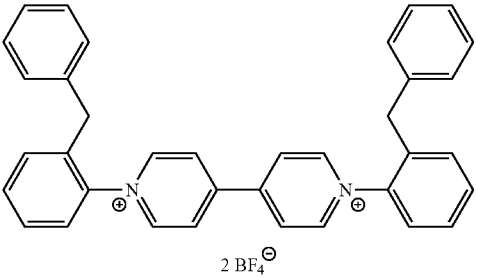<br>2 BF$_4^\ominus$ |
| I-33 | 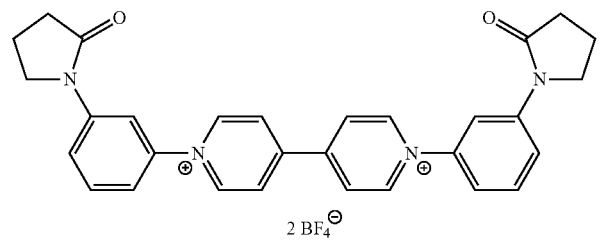<br>2 BF$_4^\ominus$ |
| I-34 | 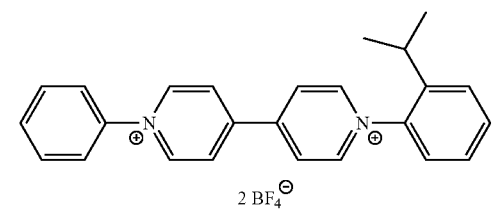<br>2 BF$_4^\ominus$ |

-continued
| Compound | Formula |
|---|---|
| I-35 | 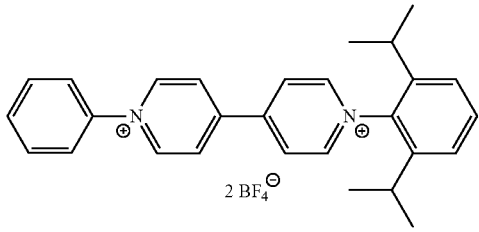 |
| I-36 | 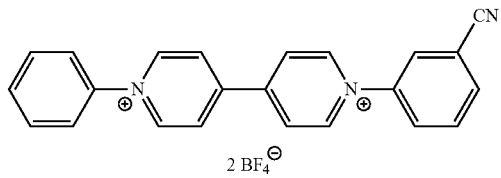 |
| I-37 | 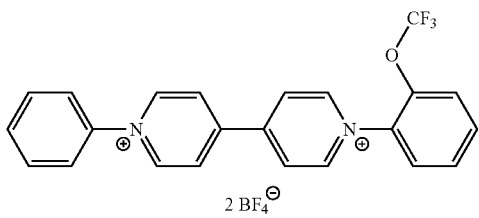 |
| I-38 | 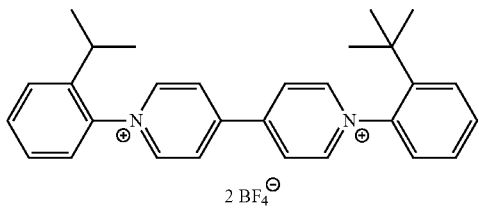 |
| I-39 | 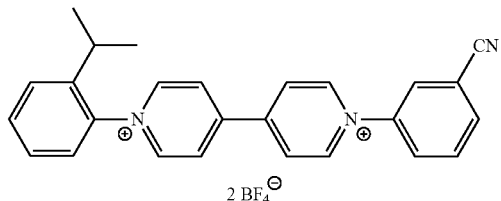 |
| I-40 | 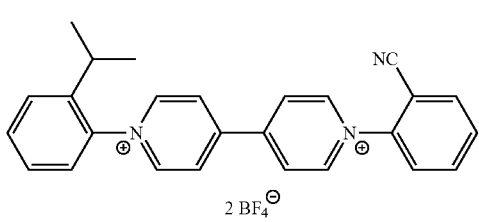 |
| I-41 | 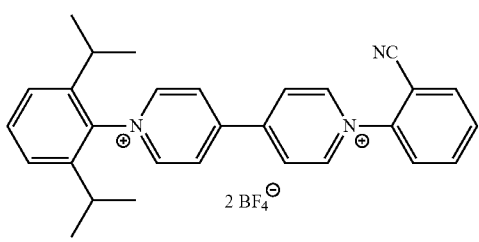 |

-continued
| Compound | Formula |
|---|---|
| I-42 | 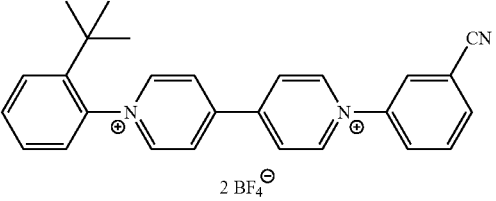 |
| I-43 | 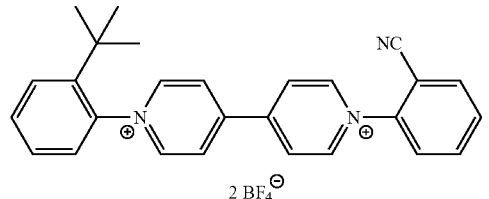 |
| I-44 | 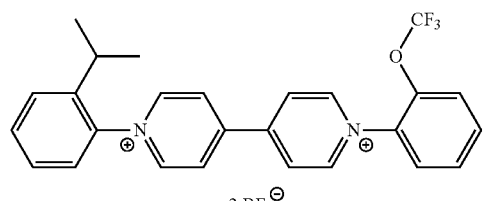 |
| I-45 | 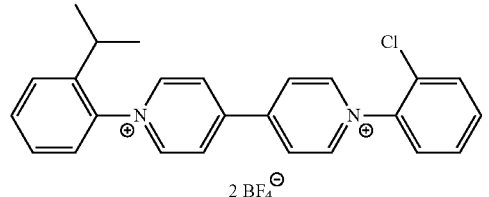 |
| I-46 | 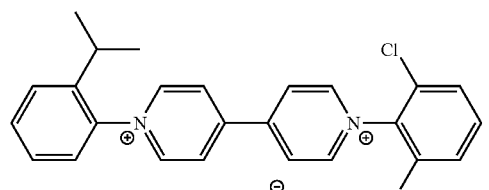 |
| I-47 | 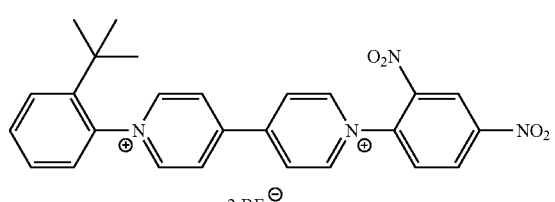 |
| I-48 | 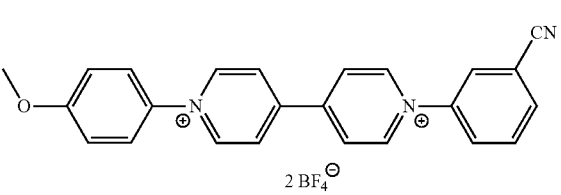 |

-continued
| Compound | Formula |
|---|---|
| I-49 | 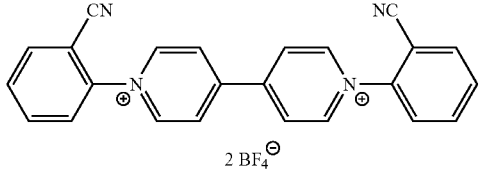<br>2 BF₄⁻ |
| I-50 | 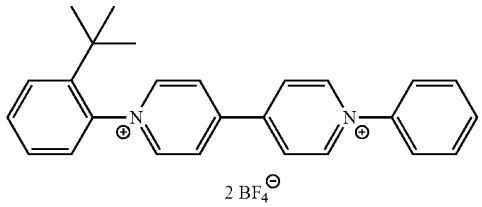<br>2 BF₄⁻ |
| III-7 | 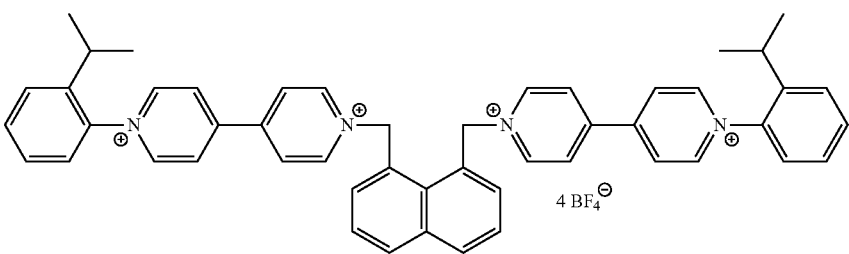<br>4 BF₄⁻ |
| III-8 | 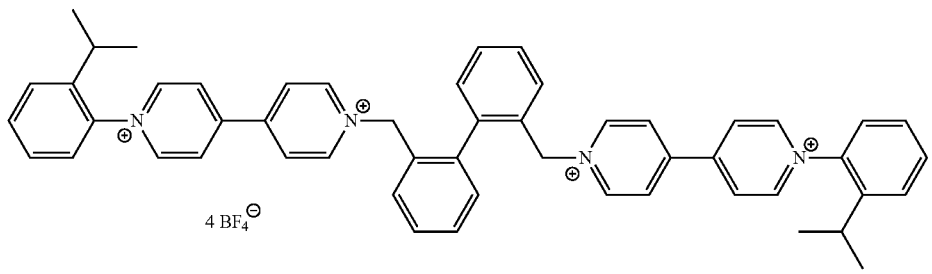 [SMILES: CC(C)c1ccccc1-[n+]1ccc(-c2cc[n+](Cc3ccccc3-c3ccccc3C[n+]3ccc(-c4cc[n+](-c5ccccc5C(C)C)cc4)cc3)cc2)cc1 ; "4 BF4"]<br>4 BF₄⁻ |
| III-9 | 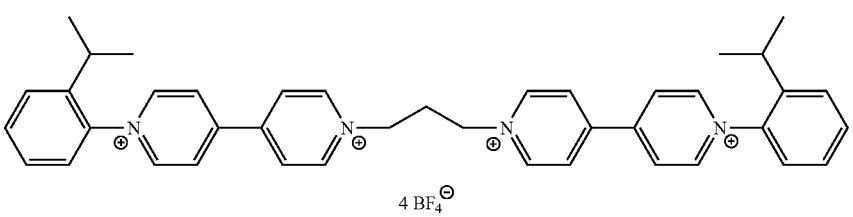 [SMILES: CC(C)c1ccccc1-[n+]1ccc(-c2cc[n+](CCC[n+]3ccc(-c4cc[n+](-c5ccccc5C(C)C)cc4)cc3)cc2)cc1 ; "4 BF4"]<br>4 BF₄⁻ |
| III-10 | 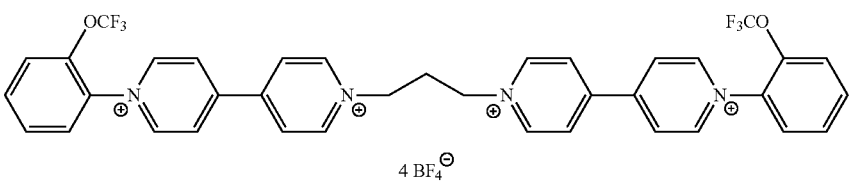 [SMILES: FC(F)(F)Oc1ccccc1-[n+]1ccc(-c2cc[n+](CCC[n+]3ccc(-c4cc[n+](-c5ccccc5OC(F)(F)F)cc4)cc3)cc2)cc1 ; "4 BF4"]<br>4 BF₄⁻ |
| III-11 | 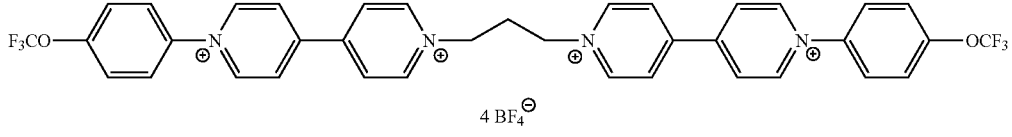 [SMILES: FC(F)(F)Oc1ccc(-[n+]2ccc(-c3cc[n+](CCC[n+]4ccc(-c5cc[n+](-c6ccc(OC(F)(F)F)cc6)cc5)cc4)cc3)cc2)cc1 ; "4 BF4"]<br>4 BF₄⁻ |

-continued
| Compound | Formula |
|---|---|
| III-12 | 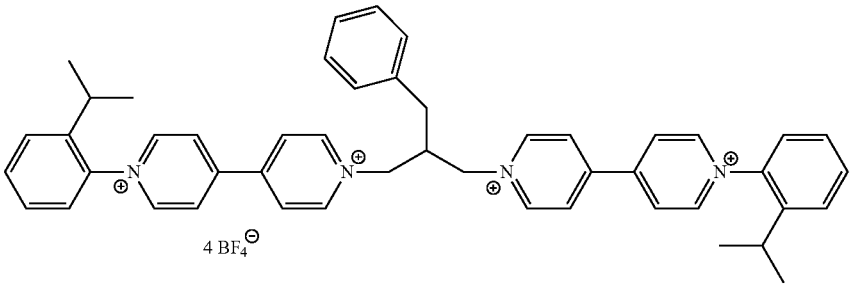 |
| III-13 | 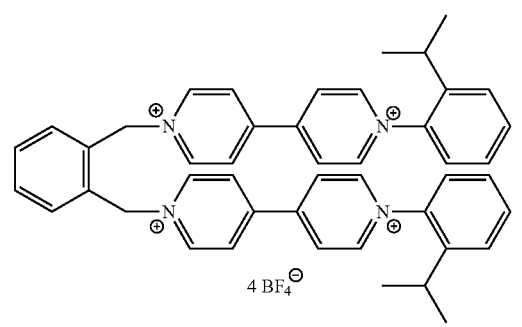 |
| III-14 | 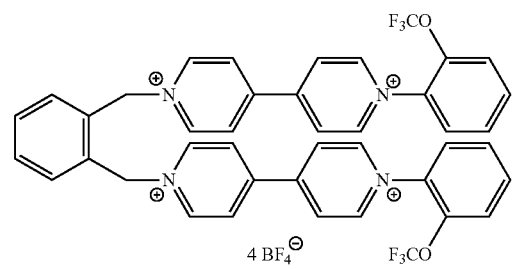 |
| III-15 | 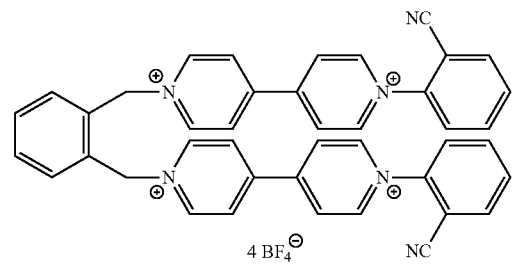 |
| III-16 | 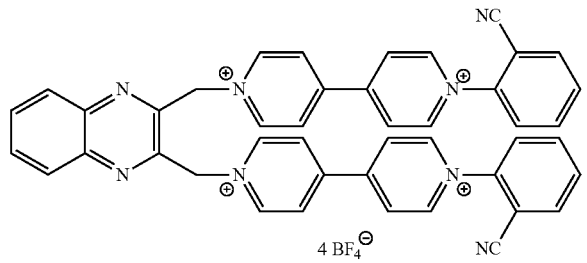 |

-continued
| Compound | Formula |
|---|---|
| III-17 | 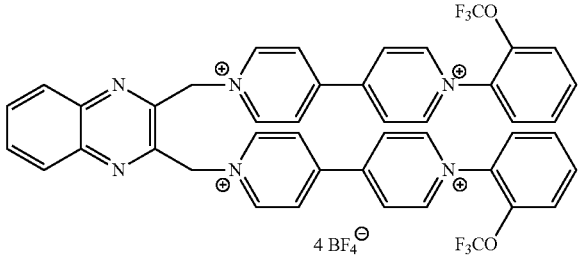 |
| III-18 | 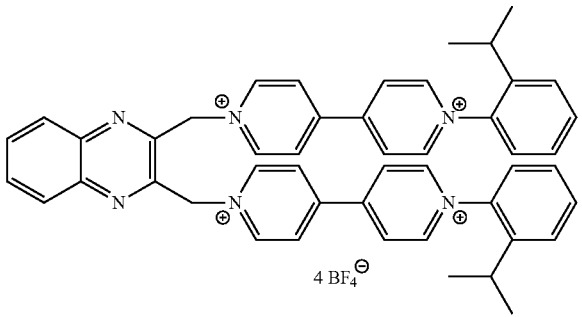 |
| III-19 | 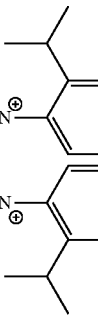 |
| IV-1 | 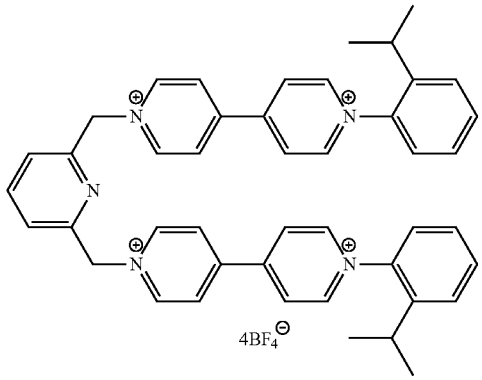 |
| IV-2 | 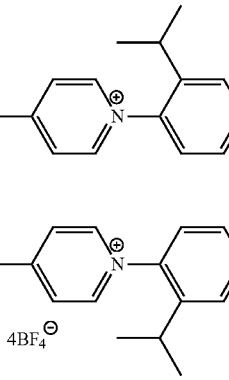 |

-continued
| Compound | Formula |
|---|---|
| IV-3 | 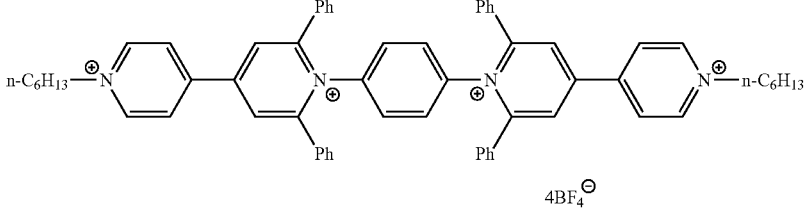 |
| IV-4 | 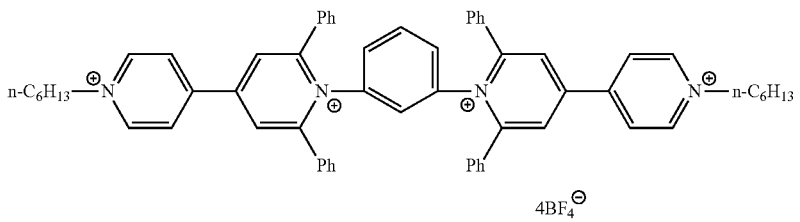 |
| IV-5 | 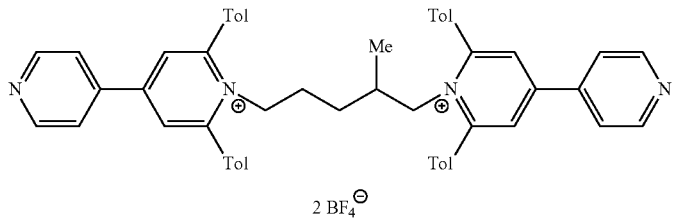 |
| IV-6 | 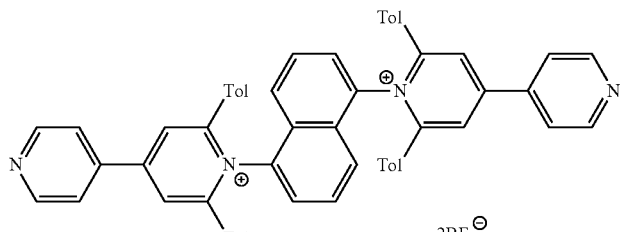 |
| IV-7 | 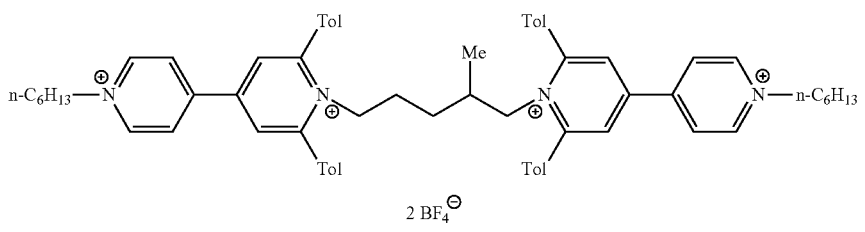 |
| IV-8 | 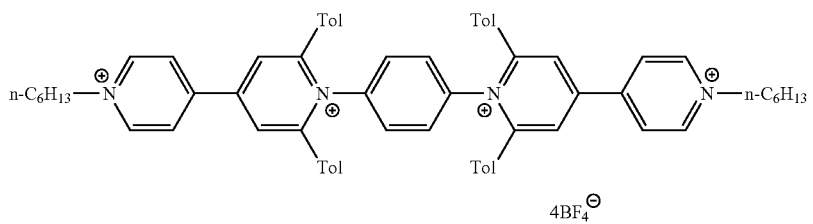 |

| Compound | Formula |
|---|---|
| IV-9 | 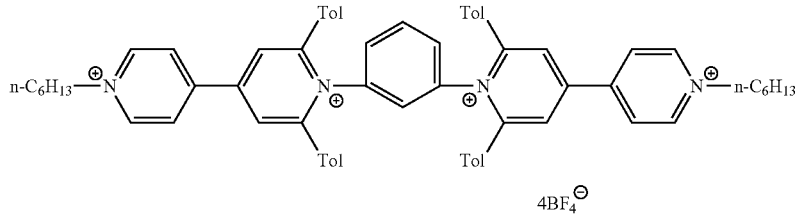<br>4BF₄⁻ |
| IV-10 | 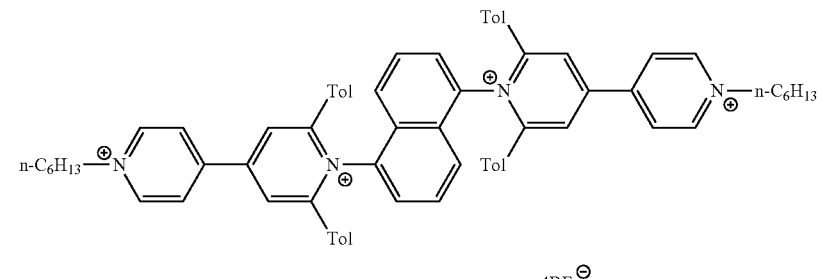<br>4BF₄⁻ |
| IV-11 | 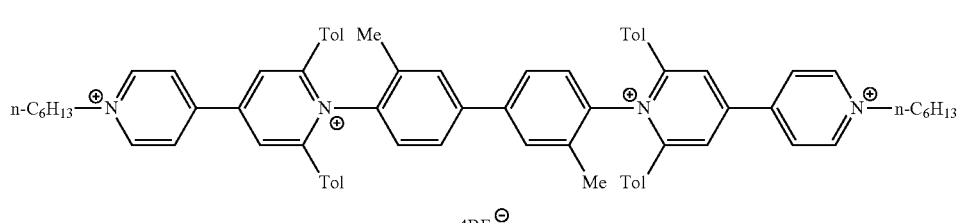<br>4BF₄⁻ |
| IV-12 | 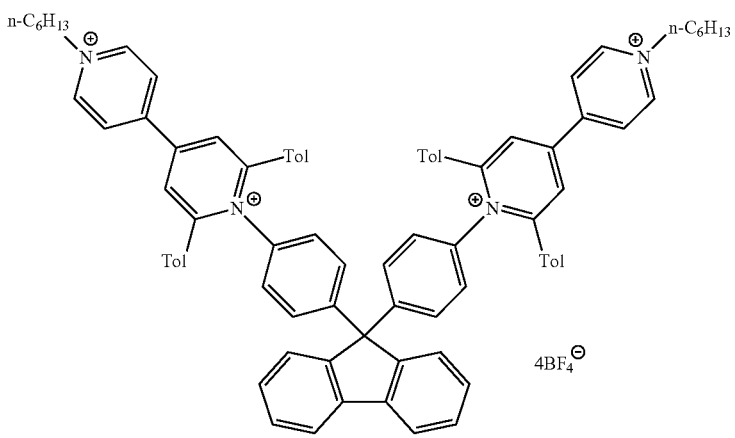<br>4BF₄⁻ |
| IV-13 | 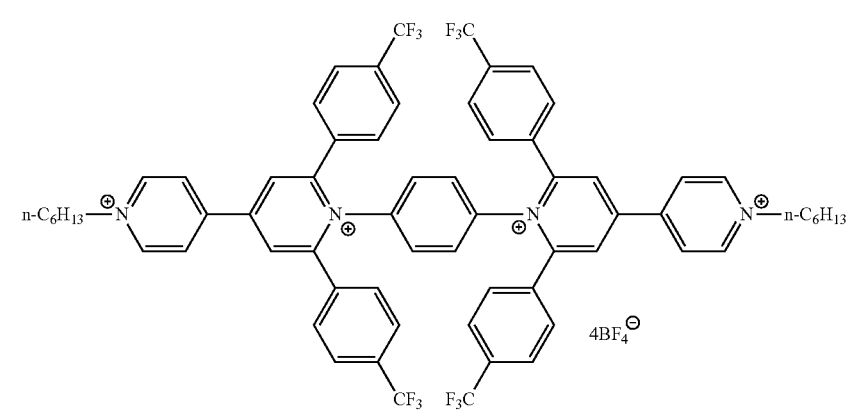<br>4BF₄⁻ |

| Compound | Formula |
|---|---|
| IV-14 | 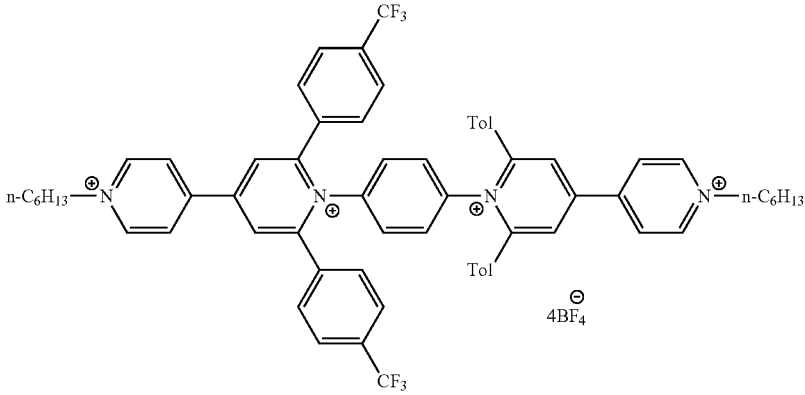 | wherein Me represents methyl, Ph represents phenyl and Tol represents 4-methylphenyl.

11. The electrochromic composition according to claim 1, wherein the reducing compound is selected from: ferrocene and their derivatives; phenoxazine and their derivatives; phenazine and their derivatives; phenothiazine and their derivatives; thioanthrene; and tetrathiafulvalene.

12. The electrochromic composition according to claim 11, wherein said composition comprises a fluid, mesomorphous or gel host medium.

13. An electrochromic device comprising the electrochromic composition as defined in claim 1.

14. The electrochromic device according to claim 13, wherein said electrochromic device comprises a mechanism for holding the composition in a mechanically stable environment.

15. The electrochromic device according to claim 13, wherein said electrochromic device comprises at least one transparent electrochromic cell comprising a pair of opposed substrates facing each other and forming a gap, and the gap is filled with the electrochromic composition.

* * * * *

UNITED STATES PATENT AND TRADEMARK OFFICE
CERTIFICATE OF CORRECTION

PATENT NO.         : 9,785,030 B2
APPLICATION NO.    : 15/022775
DATED              : October 10, 2017
INVENTOR(S)        : Claudine Biver, Samuel Archambeau and Fabien Berit-Debat Page 1 of 1

It is certified that error appears in the above-identified patent and that said Letters Patent is hereby corrected as shown below:

In the Claims

Claim 7, Column 56, Line 35:

Delete " 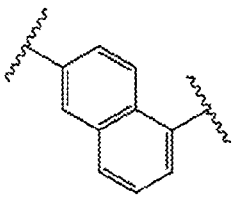 " and replace with -- 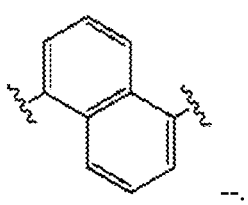 --.

Signed and Sealed this
First Day of May, 2018

Andrei Iancu
*Director of the United States Patent and Trademark Office*